| Dyestuffs | Shade on PA |
|---|---|
| 36 ![structure with N, S, HN-C=C, COOC2H5] | red |
| 37 ![structure with N, S, HN-C=C, COOCH2-CH(CH3)2] | red |

EXAMPLE 7

2 g of the dyestuff obtained according to Example 1 are dispersed in 4,000 g of water. 12 g of the sodium salt of o-phenylphenol, as a swelling agent, and 12 g of diammonium phosphate are added to this dispersion and 100 g of a yarn made of polyethylene glycol terephthalate are dyed for 1½ hours at 95° to 98°. The dyeing is rinsed and after-treated with aqueous sodium hydroxide solution and a dispersing agent.

This gives a bluish-tinged red dyeing which is fast to washing, light and sublimation.

If, in the above example, the 100 g of polyethylene glycol terephthalate yarn are replaced by 100 g of cellulose triacetate fabric, dyeing is carried out under the indicated conditions and the dyeing is then rinsed with water, a bluish-tinged red dyeing which has very good fastness to washing and sublimation is obtained.

EXAMPLE 8

2 g of the dyestuff obtained according to Example 1 are finely suspended in 2,000 g of water which contains 4 g of oleylpolyglycol ether, in a pressure-dyeing machine. The pH value of the dye bath is adjusted to 4 to 5 with acetic acid.

100 g of a fabric made of polyethylene glycol terephthalate are now introduced at 50°, the bath is heated to 140° in the course of 30 minutes and dyeing is carried out for 50 minutes at this temperature. The dyeing is then rinsed with water, soaped and dried. When these conditions are maintained, a bluish-tinged red dyeing which is fast to washing, perspiration, light and sublimation is obtained.

The dyestuffs described in the other examples give dyeings of equal quality by this process.

If, in the above example, the 100 g of polyethylene glycol terephthalate yarn are replaced by 100 g of cellulose triacetate yarn, dyeing is carried out under the indicated conditions and the dyeing is then rinsed with water, a bluish-tinged red dyeing which has very good fastness to light and sublimation is obtained.

EXAMPLE 9

Polyethylene glycol terephthalate fabric is impregnated, on a padder, at 40° with a liquor of the following composition: 20 g of the dyestuff obtained according to Example 1, finely dispersed in 7.5 g of sodium alginate, 20 g of triethanolamine, 20 g of octylphenolpolyglycol ether and 900 g of water.

The fabric, which is squeezed off to about 100%, is dried at 100° and then set for 30 seconds at a temperature of 210°. The dyed goods are rinsed with water, soaped and dried. Under these conditions a bluish-tinged red dyeing which is fast to washing, rubbing, light and sublimation is obtained.

The dyestuffs described in the other examples give dyeings of equal quality by this process.

EXAMPLE 10

100 g of "Banlon" ® tricot (a polyamide fabric) are introduced at 40° into a dye bath which contains 1 g of the dyestuff obtained according to Example 7 and 3 ml of 85% strength formic acid in 5,000 ml of water. Whilst agitating well, the bath is heated to the boil in the course of 30 minutes and dyeing is carried out for one hour at the boil. The dyed goods are then carefully rinsed and dried. A clear, brilliant, scarlet dyeing of good tinctorial strength is obtained.

EXAMPLE 11

100 g of wool, which has been well pre-wetted, are introduced at 50° into a dye bath which contains 1 g of the dyestuff obtained according to Example 7, 5 g of sodium sulphate and 3 ml of 40% strength acetic acid in 5,000 ml of water, the bath is heated to the boil in the course of 15 minutes and dyeing is carried out for one hour at the boil. A clear, brilliant and fluorescent scarlet wool dyeing is obtained.

What is claimed is:

1. A naphtholactam dyestuff of the formula

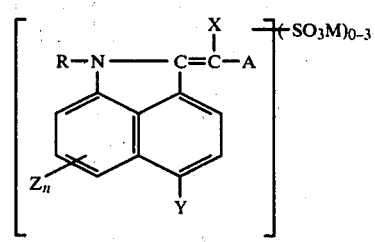

wherein

R is hydrogen, alkyl of 1–8 carbons, hydroxyalkyl of 2–3 carbons, alkoxyalkyl of 3–8 carbons, β-chloroethyl, β-cyanoethyl, alkoxycarbonylethyl wherein the alkoxy moiety thereof has 1–4 carbons, carbamoylethyl, N-alkylcarbamoylethyl wherein the alkyl moiety thereof has 1–4 carbon atoms, N,N-dialkylcarbamoylethyl wherein each alkyl moiety thereof has 1–4 carbon atoms, cyclohexyl, benzyl, phenethyl, phenyl, or alkenyl of 1–5 carbon atoms; Y is —CN, —COCl, —CO—Q' or —COOR$_1$; X is —COOH, —COO$^\ominus$ cation$^\oplus$, —CN, —COOR$_1$, or —SO$_2$T; A is

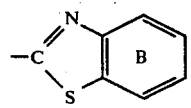

wherein

NAPHTHOLACTAM DYESTUFFS

This is a continuation of application Ser. No. 793,564 filed on May 4, 1977 now abandoned.

The invention relates to naphtholactam dyestuffs of the general formula (I)

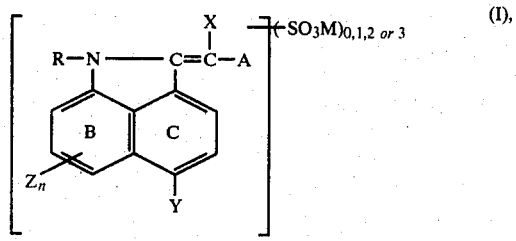

(I), in which R represents alkyl, alkenyl, cycloalkyl, aralkyl, aryl or, preferably, hydrogen, X represents —COOH, —COO$^{\ominus}$ cation$\oplus$, a modified carboxyl group, the radical —SO$_2$—T or a heterocyclic radical, T denoting alkyl, alkenyl or, preferably, aryl, M represents hydrogen or a cation, Y represents a free or modified carboxyl group, Z represents a non-ionic substituent, n represents 0, 1 or 2 and A represents a heterocyclic radical or —CN and B and C can carry further non-ionic substituents.

The new dyestuffs of the formula (I) can be manufactured by various processes.

A particularly advantageous process consists in subjecting a naphtholactam compound of the formula (II)

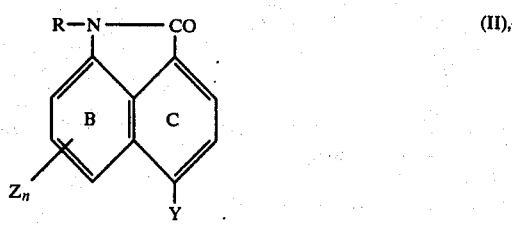

(II), to a condensation reaction, in the presence of an acid condensing agent, preferably phosphorus oxychloride, with a compound of the formula $$X—CH_2—A \qquad (III)$$

which contains an active methylene group, and optionally subsequently sulphonating, brominating, chlorinating, nitrating and/or saponifying the resulting condensation product; in formulae (II) and (III) R, X, Y, Z, A, B, C and n have the meaning indicated above.

Another of these processes is characterised in that a compound of the formula

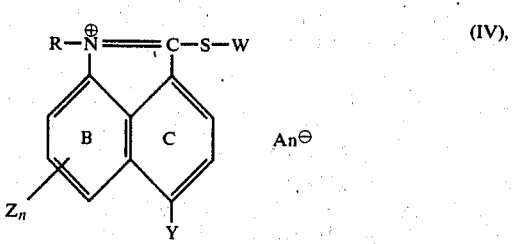

(IV), in which W represents a C$_1$–C$_4$-alkyl radical, preferably methyl or ehtyl, An represents an anion, and R, Z, Y, B, C and n have the meaning indicated above, is subjected to a condensation reaction with a compound of the formula $$X—CH_2—A \qquad (V)$$

in which X and A have the same meaning as above, W—SH and H—An being split off, and, if desired, the resulting condensation product is sulphonated, brominated, chlorinated, nitrated and/or saponified.

Dyestuffs of the formula (I) in which X is —CO—OR$_1$, —CO—Q, —SO$_2$—T, a heterocyclic structure or, preferably, —CN, in which R$_1$ denotes optionally substituted alkenyl, cycloalkyl, aralkyl, aryl or, preferably, alkyl, T has the same meaning as above and Q is the radical of an amine of the formula Q—H, Y represents —CN, —COCl, —CO—Q' or, preferably, —CO—OR$_1$', in which Q' is the radical of an amine H—Q' and R$_1$' is optionally substituted alkyl, alkenyl, cycloalkyl, aralkyl or aryl or a heterocyclic radical, Z represents bromine, chlorine or hydrogen and A and R have the same meaning as above, are preferred.

The radical A is preferably a heterocyclic structure of the formula

in which Z' represents the members necessary to complete a heterocyclic 5-membered or 6-membered ring, which can also contain fused aromatic rings, and in which the rings can contain non-ionic substituents.

Particularly preferred dyestuffs are derived from the reactive derivatives o benzimidazole, benzoxazole, benzthiazole, pyridine, quinoline, phenanthridine, indolenine, thiadiazole, triazole, pyrimidine and isoquinoline.

X preferably denotes cyano and if it represents a heterocyclic structure also denotes, for example, the group of the formula

in which Z' is the same as above.

In the carboxamide groups —CO—Q and —CO—Q', Q and Q', which represent the radicals of the amines of QH and Q'H, independently of one another denote methylamino, ethylamino, dimethylamino, diethylamino, dipropylamino, di-n-butylamino, N-methyl-N-butylamino, N-(2-hydroxy-, 2-chloro-, 2-methoxy-, 2-bromo- or 2-cyano-ethyl)-amino, N,N-di-(2-hydroxy-, 2-chloro-, 2-methoxy- or 2-cyanoethyl)-amino, N-2-cyanoethyl-N-ethylamino-, N-2-cyanoethyl-N-2-hydroxyethylamino, N-2-lower alkoxy (for example C$_1$-C$_4$-alkoxy)-N-lower alkyl (for example C$_1$-C$_4$-alkyl-, especially methyl)-amino, N-methoxyethyl-N-cyanoethylamino, N-methyl-N-ethylamino, N-2-methylthioethylamino, N-2-methylsulphonylethylamino, γ-methoxypropylamino, γ-cyanopropylamino, γ-carboxypropylamino, γ-sulphopropylamino, N-hydroxyethyl-N-cyclohexylamino, 3-hydroxy-1,1-dimethyl-propylamino, benzylamino, o-,

| Dyestuffs | Shade on PA |
|---|---|
| 19 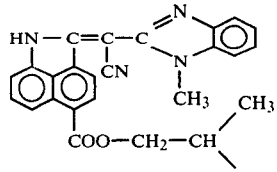 | red |
| 20 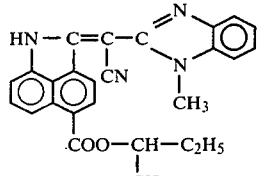 | red |
| 21 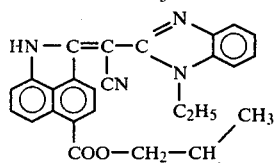 | red |
| 22 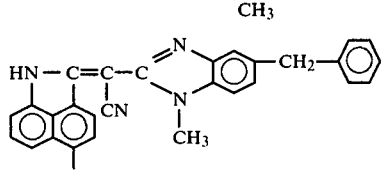 | red |
| 23 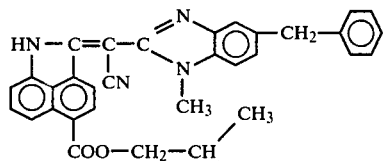 | red |
| 24 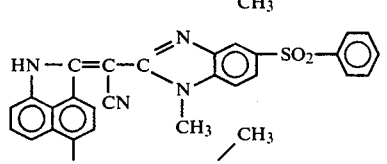 | red |
| 25 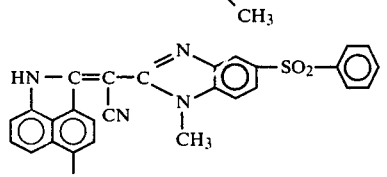 | red |
| 26 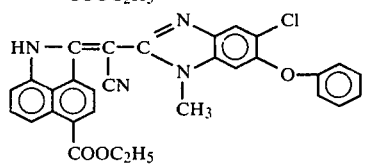 | red |
| 27 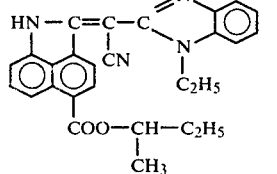 | red |
| 28 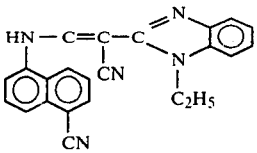 | red |
| 29 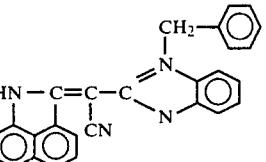 | red |
| 30 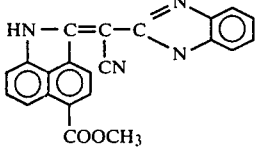 | red |
| 31 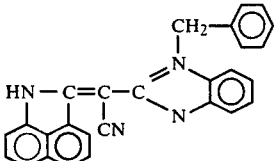 | red |
| 32 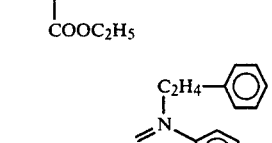 | red |
| 33 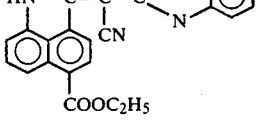 | red |
| 34  | red |
| 35 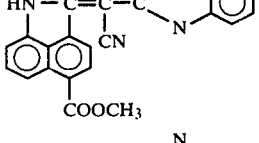 | red |

Possible cations M are those of inorganic or organic bases, possible inorganic cations being, in particular, alkali metal cations, such as Na, K and Li, and ammonium, and possible organic cations being, for example, pyridinium, alkyl-ammonium and dialkyl-ammonium, in which the alkyl groups preferably have 1 to 4 carbon atoms, as well as cations of basic dyestuffs. Monosulphonated dyestuffs are preferred.

The reaction of the naphtholactam of the formula (II) with the compounds of the formula (III) which contain an active methylene group is carried out in the presence of an acid condensing agent, such as phosphorus oxybromide, phosphorus trichloride, phosphorus tribromide, phosphorus pentachloride, thionyl chloride, phosgene (in an autoclave) or mixtures of phosphorus oxychloride and phosphorus pentoxide, but especially in the presence of phosphorus oxychloride.

The reaction is advantageously carried out with heating, for example at temperatures of 50° to 200° C., but preferably in a range from 60° to 130° C. It is appropriately carried out in an inert organic solvent such as benzene, toluene, xylene, chlorobenzene, dichlorobenzene, nitrobenzene, ethylene chloride, carbon tetrachloride or chloroform.

The condensation reaction of compound IV and V is carried out under alkaline reaction conditions, appropriately in an organic solvent, such as methanol, ethanol, butanol, ethylene glycol monomethyl ether, dimethylformamide, pyridine or chlorobenzene, in the presence of a condensing agent having an alkaline reaction, such as triethylamine, potassium carbonate, sodium hydroxide or magnesium oxide, at elevated temperature, appropriately at 40° to 160° C. and preferably at 60° to 100° C.

The starting materials of the formula (III) are accessible by a known route by reacting a naphtholatam compound of the formula (V) with a diphosphorus pentasulphide to give the corresponding thione compound and reacting the latter with quaternising agents R-An, preferably dimethyl sulphate.

The optimal subsequent sulphonation of compounds of the formula I which are free from sulphonic acid groups is appropriately carried out by reacting the compounds with customary sulphonating agents, preferably oleum containing 5 to 60% of $SO_3$, one to two sulpho groups being introduced by this means. The reaction is appropriately carried at temperatures between 5° and 50° C. by methods which are in themselves known.

The optional nitration is carried out in the customary manner using a mixture of nitric acid and sulphuric acid and halogenation is carried out by means of the action of elementary bromine or chlorine.

A further route to the dyestuffs of the formula I consists in carrying out the condensation reaction with halogen-containing condensing agents, such as, in particular, phosphorus oxychloride, so that a —CO-halogeno group, especially a chlorocarbonyl group, is formed in the 4-position of the naphtholactam and this group is subsequently reacted with alcohols, phenols, amines or mercaptans to give the corresponding esters, amides or thio-esters.

Alcohols and phenols which are suitable for the reaction are, for example, methanol, ethanol, n-propanol, i-propanol, butanol, sec.-butanol, iso-butanol, 1,2-dihydroxybutane, 2,5-dihydroxyhexane, 3-methyl-1,5-dihydroxypentane, 2-ethyl-hexanol, 2,2-dimethylpentanol, 2,2,4-trimethylpentanol, dodecyl alcohol, octadecyl alcohol, benzyl alcohol, cyclohexanol, allyl alcohol, methallyl alcohol, cinnamyl alcohol, lauryl alcohol, oleyl alcohol, cyclohexanol, tetrahydrofuryl alcohol, diethylene glycol monomethyl ether or diethylene glycol monoacetate, triethylene glycol monobutyl ether, ethylene glycol, 1,3-propylene glycol, 1,4-butanediol, 1,5-pentanediol, 1,6-hexanediol, neopentyl glycol, 2,2-diethylpropane-1,3-diol, 2-ethyl-2-butylpropane-1,3-diol, 2-ethyl-2-propylpropane-1,3-diol, 2,2,4-trimethylhexane-1,6-diol, 2-ethyl-2-methylpropane-1,3-diol, 1,10-decanediol, diethylene glycol, triethylene glycol, $\beta,\beta'$-thiodiethanol, 1,1-, 1,2-, 1,3- and 1,4-dimethylolcyclohexane and 1,2-, 1,3- and 1,4-$\alpha,\alpha'$-xylene glycol; as well as phenol and mono- and poly-alkylphenols, for example 2-, 3- or 4-methyl-, -ethyl-, -n-propyl-, -isopropyl-, -n-butyl-, -iso-butyl-, -tert.butyl-, -n- or -iso-pentyl-, -n- or -iso-dodecyl-, -n- or -iso-palmityl-, -n- or -iso-stearyl-, -ethane-, -propene-, -butene- and -ethinephenol, 2,3-, 2,4-, 2,5- 2,6- 3,4- or 3,5-dimethyl-, -diethyl- and -dipropyl-phenols, 2,3,4-, 2,3,5-, 2,3,6-, 3,4,5- or 2,4,6-trimethyl-, -triethyl- and -tripropyl-phenols, 2,3,5,6-, 2,3,4,5- or 2,3,5,6-tetramethyl-, -tetraethyl- and -tetrapropyl-phenols and 2,3,4,5,6-pentamethyl-phenol, it also being possible for the abovementioned alkyl radicals to be mixed, for example 2,6-dimethyl-4-tert.-butyl-phenol; cycloalkylphenols, for example 2-, 3- or 4-cyclohexyl-phenol; substituted alkylphenols, for example 4-chloromethyl-, 4-hydroxymethyl- and 3-trifluoromethyl-phenol; aralkylphenols, for example 2-, 3- or 4-benzylphenols; arylphenols, for example 2-, 3- or 4-hydroxy-diphenyl; alkylamino-, arylamino- and acylamino-phenols, for example 2-, 3- or 4-acetylamino-, 2-, 3- or 4-benzoylamino-, 2-, 3- or 4-methacroylamino- and N-methyl-N-formyl-4-amino- phenol; halogenophenols, for example 2-, 3- or 4-chloro- or -bromophenol, 2,3-, 2,4-, 2,5-, 2,6-, 3,4- or 3,5- dichloro(bromo)-phenol, 2-methyl-5-chloro-, 2-methyl-6-chloro-, 3-methyl-4-chloro-, 5-methyl-2-chlor-, 2-methyl-4-chloro- or 2-methyl-3-chloro-phenol and 3,5,3',5'-tetrchloro-2,2'- dihydroxydiphenyl; nitrophenols, for example 2-, 3- or 4-nitrophenol, 2-methyl-5-nitro-, 4-methyl-2-nitro-, 3-methyl-4-nitro-, 4-methyl-3-nitro- and 3,5-dimethyl-4-nitro-phenol; hydroxyphenylsuphonic acids and hydroxyphenylcarboxylic acids and their esters and amides, for example 3- or 4-hydroxybenzoic acid or -benzenesulfonic acid, 2-, 3- or 4-hydroxybenzoic acid (or -benzenesulphonic acid) methyl ester, propyl ester, isobutyl ester, phenyl ester, naphthyl ester and halogenophenyl esters, 2-hydroxy-5-chlorobenzoic acid ester, 2-cyanato-3methyl-benzoic acid esters, 2-, 3- or 4-hydroxybenzoic acid dimethylamide, diethylamide, morpholylamide or piperidylamide; alkoxy-, aryloxy- and acyloxy-phenols, for example 2-, 3- or 4-methoxy-, -ethoxy-, -propoxy-, -isopropoxy-, -butoxy-, -phenoxy-, -acetoxy- and -benzoxy-phenols, N,N- dialkylcarbamate and 4-allyl-2-methoxyphenol; acylphenols, for example 2-, 3- or 4-acetyl-, -propionyl- and -benzoyl-phenol and 4-acetyl-1,3-dihydroxybenzene; cyanophenols, for example 2-, 3- or 4-cyanophenol; phenols with S-containing substituents, for example 2-, 3- or 4-methylmercapto-, -ethylmercapto-, -propylmercapto-, -phenylmercapto-, -acetylmercapto- and -benzoylmercapto-phenols, 3-or 4-mercaptophenols, 2,4-bis- methylmercapto-3-methyl-phenyl and

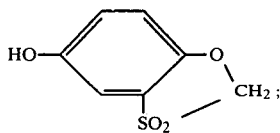

polyhydric phenols, such as, for example pyrocatechol, hydroquinone, resorcinol and the like; alkylated dihydroxyphenols, such as, for example, 1,3-dihydroxy-4-methylbenzene or 1,2-dihydroxy-4-hexylbenzene; alkoxylated dihydroxyphenols, such as, for example, 1,4-dihydroxy-3-hexoxybenzene; cycloaliphatic phenols, such as, for example, p-cyclopentylphenol or p-cyclohexylphenol; halogenated dihydroxyphenols, such as, for example, phloroglucinol or pyrogallol; and polynuclear phenols, such as, for example, 2,2-bis-(p-hydroxyphenyl)-propane, 4,4'-dihydroxydiphenyl, 2,2'-dihydroxydiphenyl, 2,4'-dihydroxydiphenyl, 2,4'-dihydroxydiphenyl and dihydroxynaphtahalenes, such as 2,6-dihydroxynaphthalene. Dihydroxyarylsulphones, for example bis-(p-hydroxyphenyl)-sulphone, 2,4'-dihydroxydiphenylsulphone. 5'-chloro-2,4-dihydroxydiphenylsulphone, 5'-chloro-2,4'-dihydroxydiphenylsulphone, 3'-chloro-4,4'-dihydroxydiphenyl-sulphone and bis-(4-hydroxyphenyl)-biphenyldisulphone, can also be used.

Aromatic dihydroxy-ethers, for example p,p'-dihydroxydiphenyl ether, p,p'dihydroxytriphenyl ether, the 4,3'-, 4,2'-, 3,3'-, 2,2'- and 2,3'-dihydroxydiphenyl ethers and 4,4'-dihydroxy-2,5-dimethyldiphenyl ether, are also suitable, as are the addition products of equimolar amounts of ethylene oxide and mercaptans, and also n-butylmercaptan, phenylmercaptan 2-, 3- or 4-chlorophenylmercaptan, 2,4- or 2,5-dichlorphenylmercaptan, 2-, 3- or 4-methylphenylmercaptan, 2,4- or 2,5-dimethylphenylmercaptan, 2-, 3- or 4-methoxyphenylmercaptan, 2,4- or 2,5-dimethoxyphenylmercaptan, 2- or 4-nitrophenylmercaptan, 2- or 4-carbomethoxyphenylmercaptan, 2-mercapto-benzthiazole, 2-mercapto-6-chloro-benzthiazole, 2-mercapto-4-chloro-benzthiazole, 2-mercapto-4-methyl-benzthiazole, 2-mercapto-6-methyl-benzthiazole, 2-mercapto-6-methoxy-benzthiazole, 2-mercapto-6-ethoxy-benzthiazole, 2-mercapto-benzoxazole and 2-mercaptobenzimidazole.

Compounds $H_2N$—$NR_3R_4$ which can be employed, optionally in the form of their salts, such as hydrochlorides, hydrobromides, hydroiodides, nitrates, sulphates or acetates, are, for example, the following hydrazines and hydrazides and cyclohexanone hydrazone: methylhydrazine, isopropylhydrazine, phenylhydrazine, 2-nitrophenylhydrazine, 3-nitrophenylhydrazine, 4-nitrophenylhydrazine, 2,4-dinitrophenylhydrazine, 2-chlorophenylhydrazine, N-aminopiperidine, N-aminopyrrolidine, N-aminomorpholine, N-aminocarbazole, N-aminotetrahydro(iso)quinoline, methanesulphonic acid hydrazide, ethanesulphonic acid hydrazide, isopropanesulphonic acid hydrazide, hexanesulphonic acid hydrazide, cyclohexanesulphonic acid hydrazide, $C_1$-$C_5$-alkanoylhydrazides, such as acetylhydrazide, benzoylhydrazide, benzenesulphonic acid hydrazide, 2-, 3- or 4-toluenesulphonic acid hydrazide, 2-, 3- or 4-chloro-(bromo- or fluoro-)benzenesulphonic acid hydrazide, 2-, 3- or 4-hydroxybenzenesulphonic acid hydrazide, 2, 3- or 4-dimethylaminobenzenesulphonic acid hydrazide, 2-, 3- or 4-nitrobenzenesulphonic acid hydrazide, 2-, 3- or 4-methylmercapto-benzenesulphinic acid hydrazide, quinolinesulphonic acid hydrazides, carbazolesulphonic acid hydrazides, phenylpyrazolonesulphonic acid hydrazides and imidazolesulphonic acid hydrazides.

The naphtholactam compounds of the formula II which are employed as starting materials are obtainable by reacting oxylylene dicyanide with glyoxal in the presence of a base (NaOH or KOH) and a solvent at temperature below 50° C. (for example 0° to 40° C.) to give 1,4-dicyanonaphthalene and subsequently either a) saponifying the 1,4-dicyanonaphthalene in a basic or, preferably, acid medium to give the 1,4-dicarboxylic acid and either converting the 1,4-naphthalene-dicarboxylic acid into a functional derivative and then converting the latter, using a 10 to 50% excess of nitric acid, to the 8-nitro-1,4-naphthalene-dicarboxylic acid derivative and reducing this to the 8-amino derivtive, or nitrating the 1,4-naphthalenedicarboxylic acid direct and subsequently reducing the reaction product to the 8-amino-naphthalene-1,4-dicarboxylic acid, and then converting the 8-amino derivative into the 1,8-naphtholactam-4-carboxylic acid, or functional derivatives thereof, either by spontaneous cyclisation or by warming, or b) nitrating the 1,4-dicyanonaphthalene in the 8-position using a 10 to 50% excess of nitric acid and subsequently reducing the nitro group to the 8-amino group, effecting naphtholactam cyclisation by spontaneous formation or by warming and saponifying the cyano group in the 4-position, if this has not already been saponified during the reduction of the 8-nitro group, in a basic or acid medium, optionally via the stage of the 4-carboxamido-1,8-naphtholactam.

The naphtholactams which carry an organic group as the substituent R on the lactam ring are obtained, for example, by alkylating the corresponding naphtholactams which carry hydrogen on the nitrogen atom of the lactam ring (R=H) in a polar aprotic solvent, such as dimethylformamide or N-methylpyrrolidone, with a toluenesulphonic acid ester of the formula

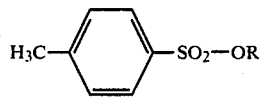

in the presence of a strong base, such as sodium hydroxide or potassium hydroxide.

R has the same meaning as above.

Preferred starting compounds of the formula III which contain an active methylene group are the azoleacetic acid derivatives of the formula

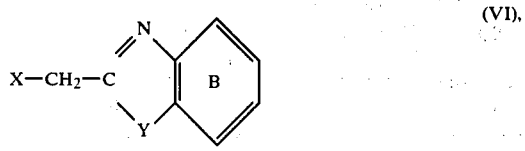

(VI), in which Y denotes a —S— or —O-atom or a —NR"-group and the ring B can carry non-ionic substituents or optionally substituted fused rings, possible substituents for ring B being, for example, one or more halogen atoms, which in this context are generally to be understood as, in particular, chlorine atoms or bromine atoms, lower alkoxy groups (for example methoxy, ethoxy, propoxy or butoxy groups), or hydroxyl, cyano, vinyl, nitro, lower alkylamino, dialkylamino, phenylamino, N-phenyl-N-alkylamino, phenyl, phenoxy, acyl, acyloxy or acylamino groups. Lower alkyl groups, especially unsubstituted methyl and ethyl groups, are particularly preferred.

Examples of suitable compounds of the formula VI which may be mentioned are: benzoxazole-2-yl-acetic acid esters, methyl 5-methyl-benzoxazol-2-yl-acetate, n-propyl 4,5-dimethylbenzoxazol-2-yl-acetate, ethyl 5-chloro-benzoxazol-2-yl-acetate, methoxyethyl 5-bromobenzoxazol-2-yl-acetate, ethyl naphth-[1,2-d]-oxazol-2-yl-acetate, methyl naphth-[2,3-d]-oxazol-2-yl-acetate, ethyl 5-ethylsulphonyl-benzoxazol-2-yl-acetate, benzoxazol-2-yl-acetamide, 5-methylbenzoxazol-2-yl-acetamide, 5-chloro-benzoxazol-2-yl-acetamide, 5-ethylsulphonyl-benzoxazol-2-yl-acetamide, 5-dimethylaminosulphonyl-benzoxazol-2-yl-acetamide, 5-methyl-benzoxazol-2-yl-acetic acid methylamide, 4,5-dimethyl-benzoxazol-2-yl-acetic acid methylamide, 5-cyclohexyl-benzoxazol-2-yl-acetic acid cyclohexylamide, 5-phenylbenzoxazol-2-yl-acetic acid isophorylamide, naphth-[1,2-d]-oxazol-2-yl-acetic acid methylamide, 5-methoxybenzoxazol-2-yl-acetic acid n-propylamide, 5-bromo-benzoxazol-2-yl-acetic acid methylamide, 5-benzyl-benzoxazol-2-yl-acetic acid methylamide, 5-(1′,1′,3′,3′-tetramethyl-n-butyl)-benzoxazol-2-yl-acetic acid anilide, 5-phenylsulphonyl-benzoxazol-2-yl-acetic acid anilide, 5-benzylsulphonyl-benzoxazol-2-yl-benzoxazol-2-yl-acetic acid methylamide, 5-diethylaminocarbonyl-benzoxazol-2-yl-acetic acid n-butylamide, 5-methoxy-benzoxazol-2-yl-acetic acid cyclohexylamide, 5-ethoxy-benzoxazol-2-yl-acetic acid anilide, 5-phenoxybenzoxazol-2-yl-acetic acid anilide, 5-acetylamino-benzoxazol-2-yl-acetic acid 3′-methoxy-n-propylamide, 5-chloro-benzoxazol-2-yl-acetic acid methylamide, benzoxazol-2-yl-acetic acid n-propylamide, 5-methyl-benzoxazol-2-yl-acetic acid ethylamide, 5-methyl-benzoxazol-2-yl-acetic acid n-propylamide, 5-methylbenzoxazol-2-yl-acetic acid 2′-hydroxy-ethylamide, 5-methylbenzoxazol-2-yl-acetic acid 3′-methoxy-n-propylamide, 5-methylbenzoxazol-2-yl-acetic acid 2′-bromoethylamide, 5-methylbenzoxazol-2-yl-acetic acid isobutylamide, 5-methyl-benzoxazol-2-yl-acetic acid n-hexylamide, 5-methyl-benzoxazol-2-yl-acetic acid benzylamide, 5-methyl-benzoxazol-2-yl-acetic acid anilide, 5-methyl-benzoxazol-2-yl-acetic acid dimethylamide, 5-methyl-benzoxazol-2-yl-acetic acid diethylamide, 5-methyl-benzoxazol-2-yl-acetic acid di-n-butylamide, 5-methyl-benzoxazol-2-yl-acetic acid aziridide, 5-methyl-benzoxazol-2-yl-acetic acid pyrrolidide, 5-methyl-benzoxazol-2-yl-acetic acid piperidide, 5-methyl-benzoxazol-2-yl-acetic acid piperazide, 5-methyl-benzoxazol-2-yl-acetic acid morpholide, ethyl benzthiazol-2-yl-acetate, methyl 6-methyl-benzthiazol-2-yl-acetate, n-propyl 6-methoxybenzthiazol-2-yl-acetate, ethyl 6-ethoxybenzthiazol-2-yl-acetate, methyl 6-chloro-benzthiazol-2-yl-acetate, ethyl naphth-[1,2-d]-thiazol-2-yl-acetate, benzthiazol-2-yl-acetamide, 6-methylbenzthiazol-2-yl-acetic acid methylamide, 6-chloro-benzthiazol-2-yl-acetic acid ethylamide, 6-methoxybenzthiazol-2-yl-acetic acid morpholide, 6-ethoxy-benzthiazol-2-yl-acetic acid dimethylamide, bis-benzoxazolyl-methane, bis-(5-methyl-benzoxazolyl)-methane, bis-(5,6-dimethyl-benzoxazolyl)-methane, bis-(5-chlorobenzoxazolyl)-methane, bis-(5-bromobenzoxazolyl)-methane, bis-(5-fluoro-benzoxazolyl)-methane, bis-(5-ethylsulphonylbenzoxazolyl)-methane, bis-(5-tertiary butyl-benzoxazolyl)-methane, bis-(5-ethyl-benzoxazolyl)-methane, bis-(5-cyclohexylbenzoxazolyl)-mthane, bis-(5-phenyl-benzoxazolyl)-methane, bis-(6-methoxy-benzoxazolyl)-methane, bis-(5-benzylbenzoxazolyl)-methane, bis-(5-dimethylaminosulphonyl-benzoxazolyl)-methane, bis-(5-diethylaminocarbonyl-benzoxazolyl)-methane, bis-(5-ethoxy-benzoxazolyl)-methane, bis-(5-phenoxy-benzoxazolyl)-methane, bis-(5-acetylamino-benzoxazolyl)-methane, bis-benzthiazolyl-methane, bis-(6-methyl-benzthiazolyl)-methane, bis-(6-methoxybenzthiazolyl)-methane, bis-(6-chloro-benzthiazolyl)-methane, benzimidazolyul-5-methyl-benzoxazolyl-methane, benzimidazolyl-benzthiazolyl-methane, benzthiazolyl-5-methyl-benzoxazolyl-methane, 5-methyl-benzimidazolyl-2-benzoxazolyl-methane, 1-methyl-benzimidazolyl-5-phenyl-benzoxazolyl-methane, 1-β-cyano-ethyl-benzimidazolyl-5-cyclohexyl-benzoxazolyl-methane, 1-ethyl-benzimidazolyl-5-chloro-benzoxazolyl-methane, 5-methyl-benzoxazolyl-acetamide-6-sulphonic acid, benzthiazolyl-acetamide-5-or -6-sulphonic acid, bis-(5-methyl-6-sulphobenzoxazolyl)-methane, 5-methylbenzoxazolyl-phenylsulphonyl-methane, benzthiazolyl-phenylsulphonylmethane, benzthiazolyl-benzylsulphonylmethane, benzthiazolylmethylsulphonylmethane, benzthiazolyl(p-methylphenyl)-sulphonylmethane, benzoxazolyl-(p-methylphenyl)-sulphonylmethane, benzthiazolyl-(p-chlorophenyl)-sulphonyl-methane, benzthiazolyl-(p-methoxy)-sulphonylmethane, benzthiazol-2-yl-acetamide-6-sulphonic acid, benzoxazol-2-yl-acetamide-6-sulphonic acid, benzimidazolyl-acetonitrile, methylbenzimidazolyl-acetonitrile, dimethylbenzimidazolyl-acetonitrile, chlorobenzimidazolyl-acetonitrile,, nitrobenzimidazolyl-acetonitrile, ethoxycarbonylbenzimidazolyl-acetonitrile, cyanobenzimidazolyl-acetonitrile, naphthimidazolyl-acetonitrile, benzimidazolyl-acetic acid esters and benzimidazolyl-acetic acid amides.

Compounds which have an active methylene group and contain 2 heterocyclic groups are, for example, those of the formula

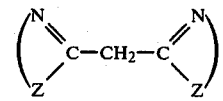

in which Z has the same meaning as above.

Further valuable heterocyclic compounds which have an active methylene group are, for example, also those of the formulae

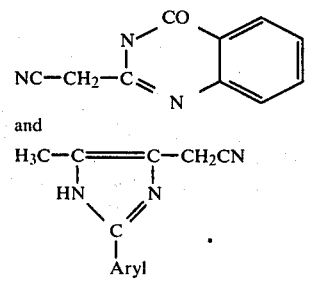

in which the aryl radical is, for example, a phenyl radical or a phenyl radical substituted by $C_1$–$C_3$-alkyl or $C_1$–$C_3$-alkoxy and

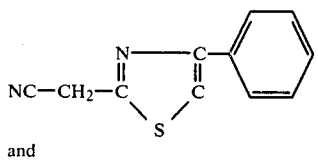

and

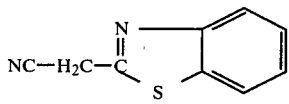

A further preferred group comprises the cyanoacetic acid derivatives, such as, for example, $C_1$-$C_5$-alkyl cyanoacetates, such as NC—$CH_2$—CO—O—($CH_3$, $C_2H_5$, $C_3H_7$ or $C_4H_9$), cyanoacetic acid hydrazide, cyanoacetamide and its N-alkylated and N-arylated derivatives, 2-cyanoacetanilide, cyanoacetylurea, cyanoacetylurethanes, such as NC—$CH_2$—CO—N-H—CO—O($CH_3$ or $C_4H_9$), and ω-cyanoacetophenones, such as NC—$CH_2$=CO—$C_6H_5$ and NC—$CH_2$—CO—$C_6H_4$—COOH(—o).

The dyestuffs of the formula (I) give brillant, luminous orange-to-red dyeings which usually fluoresce in UV light and have outstanding fastness properties in use, the dyestuffs which are free from groups conferring solubility in water being especially valuable.

The new dyestuffs are preferably free from sulphonic acid groups and are suitable for dyeing semi-synthetic and fully synthetic fibres, such as acrylic fibres or acrylonitrile fibres, polyacrylonitrile fibres and copolymers of acrylonitrile and other vinyl compounds; such as acrylates, acrylamides, vinylpyridine, vinyl chloride or vinylidene chloride, copolymers of dicyanoethylene and vinyl acetate and also acrylonitrile block copolymers, fibres made of polyurethanes, polyolefines, such as base-modified, nickel-modified or unmodified polypropylene, and cellulose triacetate and cellulose $2\frac{1}{2}$ acetate and especially fibres made of polyamides such as Nylon-6, Nylon-6,6 or Nylon 12, and fibres made of aromatic polyesters, such as those of terephthalic acid and ethylene glycol or 1,4-dimethylolcyclohexane and copolymers of terephthalic acid and isophthalic acid and ethylene glycol.

Dyeing of the said fibre materials with the dyestuffs, which preferably are sparingly soluble in water, is preferably effected from an aqueous dispersion.

It is therefore appropriate finely to divide those dyestuffs which can be used as disperse dyestuffs, by grinding with textile auxiliaries, such as, for example, dispersing agents and possibly grinding auxiliaries. Subsequent drying gives dyestuff formulations which consist of the textile auxiliary and the dyestuff.

Examples which may be mentioned of dispersing agents, of the non-ionic group, which can advantageously be used are: addition products of 8 mols of ethylene oxide with 1 mol of p-tert.-octylphenol, of 15 or 6 mols of ethylene oxide with castor oil and of 20 mols of ethylene oxide with the alcohol $C_{16}H_{33}OH$, addition products of ethylene oxide with di-[α-phenylethyl]-phenols, polyethylene oxide tert.-dodecyl thioethers, polyamine polyglycol ethers or addition products of 15 or 30 mols of ethylene oxide with 1 mol of the amine $C_{12}H_{25}NH_2$ or $C_{18}H_{37}NH_2$.

Anionic dispersing agents which may be mentioned are: sulphuric acid esters of alcohols of the fatty series with 8 to 20 carbon atoms, of the ethylene oxide adducts of the corresponding fatty acid amides, or of alkylated phenols with 8 to 12 carbon atoms in the alkyl radical; sulphonic acid esters containing alkyl radicals with 8 to 20 carbon atoms; sulphation products of unsaturated fats and oils; phosphoric acid esters containing alkyl radicals with 8 to 20 carbon atoms; fatty acid soaps and also alkylarylsulphonates, condensation products of formaldehyde and naphthalenesulphonic acid and ligninsulphonates.

Suitable cationic dispersing agents are quaternary ammonium compounds which contain alkyl or aralkyl radicals with 8 to 20 carbon atoms.

In addition to the dispersing agents, the dyestuff formulations can also contain organic solvents, especially solvents which boil above 100° C. and which preferably are miscible with water, such as mono- and di-alkylglycol ethers, dioxane, dimethylformamide or dimethylacetamide, tetramethylenesulphone or dimethylsulphoxide. The dyestuff, the dispersing agent and the solvent can advantageously be ground together.

A dyestuff formulation of this type is manufactured, for example, by mixing 2 to 30, and preferably 5 to 20, percent by weight of the dispersing agent to a paste with 10 to 55 percent by weight, and preferably approximately the two-fold to four-fold amount, of the dyestuff and about 10 to 20 parts of a glycol or of another water-retaining agent. Subsequently, for example, the pH value is adjusted to about 9 with a dilute acid, preferably with sulphuric acid or acetic acid, and the mixture is then made up to 100% with water. The mixture is then ground to the necessary fineness, for example in a glass mill or another dispersing apparatus, and during this operation the grinding temperature can be between 20° and 90° C.

The dyeing of the polyester fibres with the dyestuffs according to the invention, which are sparingly soluble in water, from an aqueous dispersion is carried out by the processes customary for polyester materials. Polyesters of aromatic polycarboxylic acids with polyhydric alcohols are preferably dyed at temperatures of above 100° C. under pressure. However, dyeing can also be carried out at the boiling point of the dye bath in the presence of colour-transfer agents, for example phenylphenols, polychlorobenzene compounds or similar auxiliarie,s, or can be effected by the thermosol process, that is to say padding with subsequent hot after-treatment, for example thermofixing, at 180° to 210° C.

Cellulose $2\frac{1}{2}$-acetate fibres are preferably dyed at temperatures of 80° to 85° C., whilst cellulose triacetate fibres are advantageously dyed at the boiling point of the dye bath. The use of colour-transfer agents can be dispensed with when dyeing cellulose $2\frac{1}{2}$-acetate fibres or polyamide fibres. Dyestuffs according to the invention can also be used for printing the said materials by customary methods.

The dyeings obtained according to the present process can be subjected to an after-treatment, for example by heating with an aqueous solution of a non-ionic washing agent.

According to the present process it is also possible to apply the indicated compounds by printing, instead of by impregnating. For this purpose, for example, a printing ink which contains the finely dispersed dyestuffs in addition to the auxiliaries customary in printing, such as wetting agents and thickeners, is used.

Furthermore, for example, synthetic fibres, such as polyesters and polyamides, can be dyed in organic solvent liquors, such as in a mixture of perchloroethylene and dimethylformamide or in pure perchloroethylene.

Deep, luminous dyeings and prints with excellent fastness propertie,s, especially fastness to light, thermofixing, sublimation, pleating, flue gas, cross-dyeing, dry-cleaning, ironing, rubbing, chlorine and set processing, such as fastness to water, washing and perspiration, are obtained by the present process.

The new dyestuffs, which are insoluble in water, can also be used for spin-dyeing polyamides, polyesters and polyolefines. The polymer to be dyed is appropriately mixed, in the form of a powder, granules or chips, as a ready-to-use spinning solution or in the molten state with the dyestuff, which is introduced in the dry state or in the form of a dispersion or solution in an optionally volatile solvent. After homogeneous dispersion of the dyestuff in the solution or melt of the polymer, the mixture is processed in a known manner by casting, pressing or extruding to fibres, yarns, monofilaments, films and the like.

The dyestuffs according to the invention are outstandingly suitable for colouring macromolecular materials, such as lacquers, films, sheets and mouldings, for example those made of cellulose esters, such as cellulose 2½-acetate and cellulose triacetate, polyvinyl compounds, such as polyvinyl chloride and polyvinyl acetate; polyurethanes, polystyrene, polyesters, polyamides and polycarbonates in bulk. The dyestuffs which can be used for this application are, in particular, the compounds of the formula I which are not in the form of a salt and also those which contain sulpho groups and are in the form of salts of suitable organic cations, such as, for example, those of alkylamines which solubilise fats or of basic dyestuffs.

The dyestuffs according to the invention possess high fastness to light, even in light dyeings and in combination with other disperse dyestuffs, high brilliance (fluorescence), high fastness to sublimation, a low sensitivity to carriers in respect of the fastness to light and a high depth of colour, coupled with a good reserve for other fibres, for example wool fibres. They also have only a low sensitivity to changes in pH and are especially suitable for the high temperature process and the thermosol process as well as for permanent press finishing ("Koratron" process). They are also suitable for printing by all customary processes, including, inter alia, for the printing of mixed fabrics.

The possess a high fastness to light, good stability to heat and good solubility, even in the case of bulk dyeings (especially polyester spinning compositions). Coupled with a high fastness to sublimation, they display no migration on the surface when the fibres are subjected to heat treatments (for example on texturing) and display good fastness to rubbing.

The sulphonated representatives of the dyestuffs according to the invention are in the main used for dyeing wool and synthetic polyamides and, for this purpose, aqueous solutions which contain textile auxiliaries, such as, for example, levelling agents, are used.

In the example which follow, parts denote parts by weight, unless otherwise stated, percentages denote percentages by weight and the temperatures are given in degrees Centigrade.

Preparation of the Starting Materials (a) 15.6 parts by weight of o-xylylene dicyanide and 8.5 parts by weight of glyoxal hydrate (trimer) (3 $C_2H_2O_2.2H_2O$) containing 80% of glyoxal to be liberated are stirred into 200 parts by volume of methanol. 11.2 parts by weight of powdered potassium hydroxide are added in portions to the reaction mixture, at 15°, whilst stirring and under nitrogen.

After the potassium hydroxide has been added, the reaction mixture is stirred for a further 15 hours at room temperature and under nitrogen. The slightly brown-coloured reaction mixture is then freed from methanol in vacuo and diluted with 500 parts by volume of water. The crude 1,4-dicyanonaphthalene which has precipitated is filtered off and washed with water until neutral. 11 parts by weight (61.8% of theory) of 1,4-dicyanonaphthalene are obtained in the form of slightly brown-coloured small needles with a melting point of 175° to 185° C.

After recrystallising once from alcohol with the aid of 5 parts by weight of active charcoal, 5.5 parts by weight of the compound

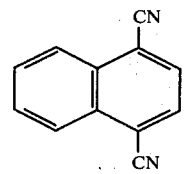

(101)

are obtained in the form of beautiful needles with a melting point of 204° to 205° C.

(b) 46.4 g of technical grade naphthalene-1,4-dicarboxylic acid (93% pure) are introduced at a temperature of 20° to 25° into a stirred flask which contains 480 g of 93% strength sulphuric acid, whilst stirring. The resulting thick suspension is cooled to 0° and a mixture consisting of 22 g of 63% strength nitric acid and 22 g of 93% strength sulphuric acid is allowed to run in dropwise in the course of 30 minutes at 0° to 2°, with external cooling. The mixture is then stirred for a further 5 hours at 0° to 5° and is then poured onto 1 kg of fine ice. The product which has precipitated is filtered off using a suction filter and is washed with water until neutral, after which the resulting product of the formula

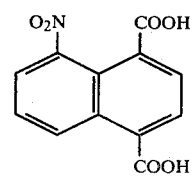

is dried in vacuo at 70°. Yield 45 g.

For purification, 45 g of the crude product are heated briefly to the boil with 225 ml of glacial acetic acid, the mixture is then allowed to cool and the product which has precipitated is filtered off at room temperature. This gives the nitro compound in the form of a pale grey powder which dissolves completely in water when sodium carbonate is added. Melting point 252°.

(c) 52 parts of 8-nitro-naphthalene-1,4-dicarboxylic acid are dissolved in 700 parts of absolute ethyl alcohol and the solution is boiled under reflux for 12 hours whilst continuously passing in hydrogen chloride gas. The resulting solution is evaporated in vacuo. The 4-ethoxycarbonyl-8-nitro-naphthalene-1-carboxylic acid of the formula

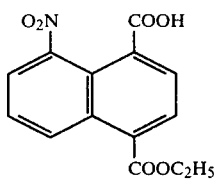

which is obtained in this way, melts at 178° to 180°.

If the monoester is hydrogenated, the 4-ethoxycarbonyl-1,8-naphtholactam described above is obtained and this confirms that the esterification of the carboxylic acid group has taken place in the 4-position.

(d) 130 parts of 8-nitro-naphthalene-1,4-dicarboxylic acid are dissolved in 500 parts of dimethylformamide, 40 parts of sodium hydroxide are added and after stirring for 30 minutes 170 parts by volume of diethyl sulphate are added all at once. The temperature then rises to 90°. The mixture is stirred for 2 hours, paying no attention to the temperature, a small amount of impurities is then filtered off from the solution and the filtrate is discharged into 2,500 parts by volume of a 10% strength sodium chloride solution and 50 parts by volume of a 30% strength sodium hydroxide solution. After stirring briefly, diethyl 8-nitro-naphthalene-1,4-dicarboxylate with a melting point of 107° to 109° is filtered off, washed and dried.

(e) 32 parts of diethyl 8-nitro-naphthalene-1,4-dicarboxylate are stirred into 200 parts of glacial acetic acid and, after adding 20 parts of iron powder, the mixture is boiled under reflux for 6 hours. For working up, the mixture is filtered hot, the filtrate is diluted with an equal volume of water and the 4-ethoxycarbonyl-1,8-naphtholactam which is thus precipitated is filtered off, washed until neutral and dried. The product of the formula

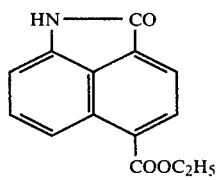

which is obtained in good yield, melts at 216° to 218°. Analysis gave the following values

|  | C | H | N |
|---|---|---|---|
| calculated: | 69.7 | 4.6 | 5.8 |
| found: | 69.3 | 4.5 | 5.6 |

(f) 29 parts of dimethyl 8-nitro-naphthalene-1,4-dicarboxylate (which can be prepared analogously to Example 5 using dimethyl sulphate) are dissolved in 500 parts of ethyl acetate and hydrogenated with Raney nickel. 4-Methoxycarbonyl-8-amino-1-naphtholactam precipitates out virtually completely. After the hydrogenation has ended, the mixture is filtered and the residue is extracted with methylglycol. Evaporated of the extraction solution gives the ester of the formula

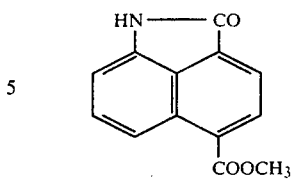

with a melting point of 264° to 266°. Analysis gave the following values:

|  | C | H | N |
|---|---|---|---|
| calculated: | 68.72 | 3.99 | 6.17 |
| found: | 68.5 | 4.0 | 5.9 |

(g) 24 parts of 4-ethoxycarbonyl-8-amino-1-naphtholactam are boiled in 180 partfs of water and 20 parts of a 30% strength sodium hydroxide solution for one hour under reflux, during which time everything goes into solution. This solution is filtered with charcoal whilst still hot and the filtrate is acidified. The 8-amino-1-naphtholactam-4-carboxylic acid which has precipitated is filtered off after cooling and washed with water and dried.

(h) 44 parts of naphthalene-1,4-dicarboxylic acid are introduced in portions into 900 parts of concentrated sulphuric acid and the mixture is stirred to give a homogeneous suspension. A few crystals of iodine and 36 parts of bromine are then added and the whole is stirred overnight at room temperature. For working up, the mixture is discharged onto ice and filtered and the product is washed with water until neutral. 8-Bromo-naphthalene-1,4-dicarboxylic acid, which is thus obtained, can be purified by recrystallisation from glacial acetic acid. Melting point 288°–290°.

|  | C | H | Br |
|---|---|---|---|
| calculated: | 48.84 | 2.39 | 27.08 |
| found: | 48.81 | 2.43 | 26.41 |

(i) 60 parts of 8-bromo-naphthalene-1,4-dicarboxylic acid are introduced into 560 parts of concentrated sulphuric acid and a mixture of 14 parts of a 98% strength nitric acid and 20 parts of concentrated sulphuric acid is added dropwise in the course of one hour, at 20°–25°, whilst stirring. A solution forms transiently and some of the 5-nitro-8-bromo-naphthalene-1,4-dicarboxlyic acid then precipitates out. This is separated off by discharging the reaction mixture onto ice, filtering off the precipitate, washing it until neutral and drying. The resulting product was analysed in the form of dimethyl 5-nitro-8-bromo-naphthalene-1,4-dicarboxylate. Melting point 115°–117°.

|  | C | H | N |
|---|---|---|---|
| calculated: | 45.68 | 2.74 | 3.80 |
| found: | 45.55 | 2.84 | 3.95 |

(j) 37 parts of dimethyl 5-nitro-8-bromo-naphthalene-1,4-dicarboxylate are stirred into 250 parts by volume of glacial acetic acid and, after adding 20 parts of iron powder, the mixture is kept under reflux for four hours. After cooling to room temperature, the residue is filtered off and dried under reflux in 200 parts by volume of water and 80 parts by volume of a 30% strength sodium hydroxide solution for two hours. The mixture is filtered hot and 4-bromo-naphtholactam-5-carboxylic acid is precipitated by acidifying the filtrate. The methyl ester of this compound has a melting point of 263°–265°.

In the following Examples and tables, the simple hexagon in each case represents the unsaturated aromatic benzenoid necleus unless otherwise indicated by the symbol H; in which case the ring is saturated.

EXAMPLE 1

A mixture consisting of 5.40 g of 5-isobutoxycarbonyl-naphtholactam, 3.50 g of benzthiazolyl-acetonitrile and 30 ml of chlorobenzene is stirred at 100° and a mixture of 3 ml of chlorobenzene and 2.10 ml of phosphorus oxychloride is allowed to run in dropwise in the course of about 30 minutes. The mixture is stirred for a further 30 minutes at the same temperature, after which it is allowed to cool. The precipitate formed is filtered off and washed with chlorobenzene and then with petroleum ether. The material on the filter is then suspended in 25 ml of isopropanol, the suspension is heated to 60° and about 32 ml of a 10% strength sodium bicarbonate solution are added to give a pH value of 8. The mixture is allowed to cool and the dyestuff of the formula

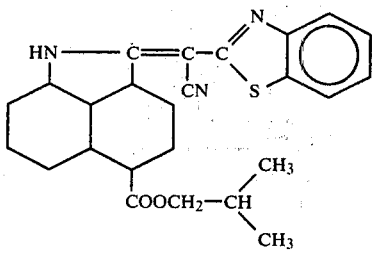

which has been liberated, is filtered off at 50°, washed with isopropanol and then dried at 70°.

When applied as a disperse dyestuff at 130°, the dyestuff dyes fabric made of polyethylene terephthalate brilliant bluish-tinged red. The dyeings possess good fastness to sublimation and light.

If, with an otherwise identical procedure, equivalent amounts of the naphtholactam compounds listed under I in the table which follows are used in place of the naphtholactam compound mentioned initially and equivalent amounts of the compounds of column II, which have an active methylene group, are used in place of benzthiazolyl-acetonitrile, dyestuffs with similar properties are obtained.

TABLE

| No. | I Naphtholactam compound | II Compound having an active methylene group | III Dyestuffs | IV Shade on polyethylene terephthalate |
|---|---|---|---|---|
| 1 | HN—=O, COOC₂H₅ | NC—CH₂—benzothiazole | HN—=C(CN)—benzothiazole, COOC₂H₅ | red |
| 2 | HN—=O, COOCH(CH₃)₂ | " | HN—=C(CN)—benzothiazole, COOCH(CH₃)₂ | " |
| 3 | HN—=O, COOC₄H₉-n | " | HN—=C(CN)—benzothiazole, COOC₄H₉-n | " |
| 4 | HN—=O, COOCH(CH₃)—C₂H₅ | " | HN—=C(CN)—benzothiazole, COOCH(CH₃)—C₂H₅ | " |

TABLE-continued

| No. | I Naphtholactam compound | II Compound having an active methylene group | III Dyestuffs | IV Shade on polyethylene terephthalate |
|---|---|---|---|---|
| 5 | 8-HN, 1-C=O, 4-COOCH₃ naphthalene | " | naphtholactam condensed with benzothiazolyl-CN methylene, 4-COOCH₃ | " |
| 6 | N-CH₃ analog, 4-COOCH₃ | " | N-CH₃, benzothiazolyl-CN, 4-COOCH₃ | violet |
| 7 | N-C₂H₅, 4-COOC₂H₅ | " | N-C₂H₅, benzothiazolyl-CN, 4-COOC₂H₅ | " |
| 8 | HN, 4-CN | " | HN, benzothiazolyl-CN, 4-CN | red |
| 9 | HN, 4-COOCH₂-CH(CH₃)₂ | NC-CH₂-(5-methylbenzoxazol-2-yl) | HN, (5-methylbenzoxazol-2-yl)-CN, 4-COOCH₂-CH(CH₃)₂ | " |
| 10 | HN, 4-COOC₂H₅ | HC-CH₂-(benzimidazol-2-yl)NH | HN, (benzimidazol-2-yl)-CN, 4-COOC₂H₅ | " |
| 11 | HN, 4-COOCH(CH₃)₂ | " | HN, (benzimidazol-2-yl)-CN, 4-COOCH(CH₃)₂ | " |
| 12 | HN, 4-COOC₄H₉-n | " | HN, (benzimidazol-2-yl)-CN, 4-COOC₄H₉-n | " |

TABLE-continued

| No. | I Naphtholactam compound | II Compound having an active methylene group | III Dyestuffs | IV Shade on polyethylene terephthalate |
|---|---|---|---|---|
| 13 | 8-amino-naphtholactam-4-COOCH(CH₃)C₂H₅ | " | corresponding benzimidazole-CN condensate with COOCH(CH₃)C₂H₅ | " |
| 14 | 8-amino-naphtholactam-4-COOCH₂CH(CH₃)₂ | " | corresponding condensate, COOCH₂CH(CH₃)₂ | " |
| 15 | 8-amino-naphtholactam-4-CN | " | corresponding condensate with 4-CN | " |
| 16 | " | 2-methyl-1-methylbenzimidazole (HC—CH₂ active methylene) | corresponding N-methyl benzimidazole condensate, 4-CN | " |
| 17 | 8-amino-naphtholactam-4-COOC₂H₅ | " | corresponding N-methyl benzimidazole condensate, COOC₂H₅ | " |
| 18 | 8-amino-naphtholactam-4-COOCH(CH₃)₂ | " | corresponding N-methyl benzimidazole condensate, COOCH(CH₃)₂ | " |
| 19 | 8-amino-naphtholactam-4-COOC₄H₉-n | " | corresponding N-methyl benzimidazole condensate, COOC₄H₉-n | " |
| 20 | 8-amino-naphtholactam-4-COOCH(CH₃)C₂H₅ | " | corresponding N-methyl benzimidazole condensate, COOCH(CH₃)C₂H₅ | " |

TABLE-continued

| No. | I Naphtholactam compound | II Compound having an active methylene group | III Dyestuffs | IV Shade on polyethylene terephthalate |
|---|---|---|---|---|
| 21 | 8-HN-naphtholactam with 4-COOCH₂CH(CH₃)₂ | " | benzimidazole (N-CH₃) condensate with CN, naphtholactam-4-COOCH₂CH(CH₃)₂ | " |
| 22 | " | 2-(cyanomethyl)-1-ethylbenzimidazole | benzimidazole (N-C₂H₅) condensate with CN, naphtholactam-4-COOCH₂CH(CH₃)₂ | " |
| 23 | 8-HN-naphtholactam with 4-COOCH(CH₃)C₂H₅ | " | benzimidazole (N-C₂H₅) condensate with CN, naphtholactam-4-COOCH(CH₃)C₂H₅ | " |
| 24 | 8-HN-naphtholactam with 4-COOC₄H₉-n | " | benzimidazole (N-C₂H₅) condensate with CN, naphtholactam-4-COOC₄H₉-n | " |
| 25 | 8-HN-naphtholactam with 4-COOCH(CH₃)₂ | " | benzimidazole (N-C₂H₅) condensate with CN, naphtholactam-4-COOCH(CH₃)₂ | " |
| 26 | 8-HN-naphtholactam with 4-COOC₂H₅ | " | benzimidazole (N-C₂H₅) condensate with CN, naphtholactam-4-COOC₂H₅ | " |
| 27 | " | 1-benzyl-2-(cyanomethyl)benzimidazole | 1-benzyl benzimidazole condensate with CN, naphtholactam-4-COOC₂H₅ | " |

TABLE-continued
| No. | I Naphtholactam compound | II Compound having an active methylene group | III Dyestuffs | IV Shade on polyethylene terephthalate |
|---|---|---|---|---|
| 28 | 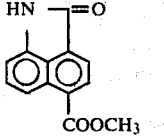 | " | 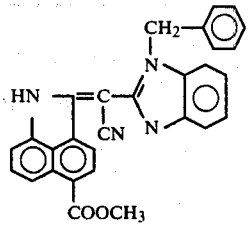 | " |
| 29 | " | 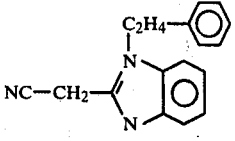 | 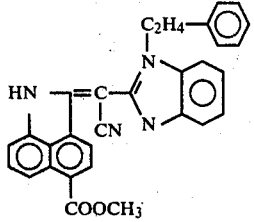 | " |
| 30 | 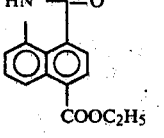 | " | 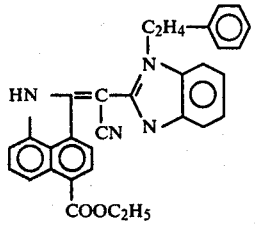 | " |
| 31 | " | 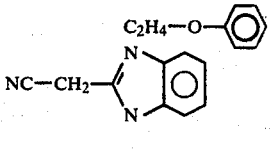 | 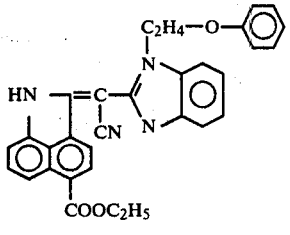 | " |
| 32 | " | 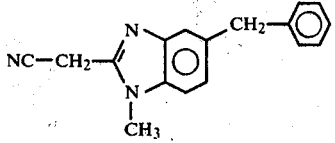 | 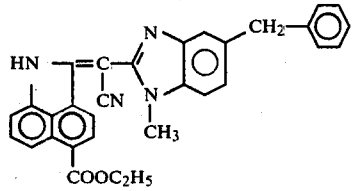 | " |
| 33 | 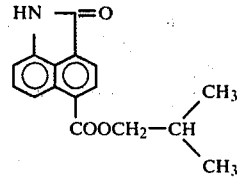 | " | 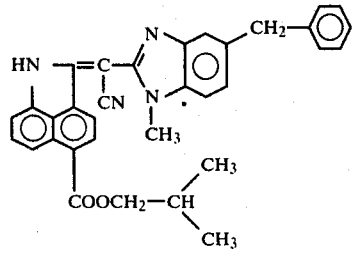 | " |

| No. | I Naphtholactam compound | II Compound having an active methylene group | III Dyestuffs | IV Shade on polyethylene terephthalate |
|---|---|---|---|---|
| 34 | " | NC—CH₂—(benzimidazole with SO₂—phenyl, N—CH₃) | HN—=C(CN)— naphthalene(COOCH₂—CH(CH₃)₂)— benzimidazole(SO₂—phenyl, N—CH₃) | " |
| 35 | HN—C=O / naphthalene-COOC₂H₅ | " | HN—=C(CN)— naphthalene(COOC₂H₅)— benzimidazole(SO₂—phenyl, N—CH₃) | " |
| 36 | " | NC—CH₂—(benzimidazole with Cl, O—phenyl, N—CH₃) | HN—=C(CN)— naphthalene(COOC₂H₅)— benzimidazole(Cl, O—phenyl, N—CH₃) | " |
| 37 | HN—C=O / naphthalene-COOCH₃ | NC—CH₂—C(=N—benzene)(N—C₂H₄—O—phenyl) | HN—=C(CN)— naphthalene(COOCH₃)— (N—benzene, N—C₂H₄—O—phenyl) | " |
| 38 | " | HN—C(=O)—benzene-C(=N—)—CH₂—CN | HN—=C(CN)— naphthalene(COOCH₃)— C(=N)—benzene-C(=O)NH | " |
| 39 | HN—C=O / naphthalene-COOCH₂—CH(CH₃)₂ | " | HN—=C(CN)— naphthalene(COOCH₂—CH(CH₃)₂)— C(=N)—benzene-C(=O)NH | " |

TABLE-continued

| No. | I Naphtholactam compound | II Compound having an active methylene group | III Dyestuffs | IV Shade on polyethylene terephthalate |
|---|---|---|---|---|
| 40 | " | [structure: H3C-N-C(=O)-phenyl with NC-CH2-C=N substituent] | [structure: naphtholactam coupled product with COOCH2-CH(CH3)2] | " |
| 41 | [structure: naphtholactam with COOC2H5] | [structure: HN-SO2-phenyl with NC-CH2-C=N substituent] | [structure: coupled dye with COOC2H5] | " |
| 42 | [structure: naphtholactam with COOCH2-CH(CH3)2] | " | [structure: coupled dye with COOCH2-CH(CH3)2] | " |
| 43 | " | [structure: H3C-N-SO2-phenyl with NC-CH2-C=N substituent] | [structure: coupled dye with COOCH2-CH(CH3)2] | " |
| 44 | [structure: naphtholactam with COOC2H5] | " | [structure: coupled dye with COOC2H5] | " |
| 45 | [structure: naphtholactam with COOCH3] | [structure: thiazole with NC-CH2 and phenyl] | [structure: coupled dye with thiazole and COOCH3] | orange |
| 46 | [structure: naphtholactam with COOC2H5] | " | [structure: coupled dye with thiazole and COOC2H5] | " |

TABLE-continued

| No. | I Naphtholactam compound | II Compound having an active methylene group | III Dyestuffs | IV Shade on polyethylene terephthalate |
|---|---|---|---|---|
| 47 | 8-HN-CO-, 5-COOCH₃-CH(CH₃)₂ naphthalene | " | corresponding dyestuff with -C(CN)=C(S-CH=CH-C₆H₅)-N= | " |
| 48 | 8-HN-CO-, 5-COOCH(CH₃)C₂H₅ naphthalene | " | corresponding dyestuff | " |
| 49 | 8-HN-CO-, 5-COOCH₃ naphthalene | NC-CH₂-C(=N-O-)−C₆H₅ (oxadiazole) | corresponding dyestuff | " |
| 50 | 8-HN-CO-, 5-COOC₂H₅ naphthalene | " | corresponding dyestuff | " |
| 51 | 8-HN-CO-, 5-COOCH₂-CH(CH₃)₂ naphthalene | " | corresponding dyestuff | " |
| 52 | 8-HN-CO-, 5-COOCH(CH₃)C₂H₅ naphthalene | " | corresponding dyestuff | " |

TABLE-continued

| No. | I Naphtholactam compound | II Compound having an active methylene group | III Dyestuffs | IV Shade on polyethylene terephthalate |
|---|---|---|---|---|
| 53 | (naphtholactam with COOCH₃) | NC—CH₂—C(=N—O—)—phenyl (1,2,4-oxadiazole) | corresponding dyestuff | " |
| 54 | (naphtholactam with COOC₂H₅) | " | corresponding dyestuff | " |
| 55 | (naphtholactam with COOCH(CH₃)C₂H₅) | " | corresponding dyestuff | " |
| 56 | (naphtholactam with COOCH₂—CH(CH₃)₂) | " | corresponding dyestuff | " |
| 57 | (naphtholactam with COOCH₃) | bis(benzothiazolyl)methane | corresponding dyestuff | red |
| 58 | " | benzothiazolyl-CH₂-SO₂-phenyl | corresponding dyestuff | " |
| 59 | (naphtholactam with COOCH₂—CH(CH₃)₂) | HC—CH₂—CN (malononitrile) | dicyanomethylene dyestuff | yellow |

TABLE-continued

| No. | I Naphtholactam compound | II Compound having an active methylene group | III Dyestuffs | IV Shade on polyethylene terephthalate |
|---|---|---|---|---|
| 60 | HN—C=O, naphthalene, COOCH(CH3)C2H5 | " | HN—, naphthalene with C=C(CN)2, COOCH(CH3)C2H5 | " |
| 61 | HN—C=O, naphthalene, COOC4H9-n | " | HN—, naphthalene with C=C(CN)2, COOC4H9-n | " |
| 62 | " | NC—CH2—COOC2H5 | HN—, naphthalene with C(CN)=C(COOC2H5), COOC4H9-n | " |
| 63 | " | NC—CH2—COO—C2H4—OCH3 | HN—, naphthalene with C(CN)=C(COOC2H4—OCH3), COOC4H9-n | " |
| 64 | HN—C=O, naphthalene, COOC2H4—OCH3 | NC—CH2—CN | HN—, naphthalene with C=C(CN)2, COOC2H4—OCH3 | " |
| 65 | HN—C=O, naphthalene, COOC2H4—OC2H5 | " | HN—, naphthalene with C=C(CN)2, COOC2H4—OC2H5 | " |
| 66 | HN—C=O, naphthalene, COOC4H9-n | CH2(CN)(CON(CH3)(C6H5)) | HN—, naphthalene with C(CN)=C(CON(CH3)(C6H5)), COOC4H9-n | " |
| 67 | " | CH2(CN)(CON(C2H5)(C6H5)) | HN—, naphthalene with C(CN)=C(CON(C2H5)(C6H5)), COOC4H9-n | " |

TABLE-continued

| No. | I Naphtholactam compound | II Compound having an active methylene group | III Dyestuffs | IV Shade on polyethylene terephthalate |
|---|---|---|---|---|
| 68 | [structure: naphtholactam with COOCH₂CH(CH₃)₂] | " | [structure: with =C(CN)-CON(C₂H₅)(phenyl)] | " |
| 69 | [structure: naphtholactam with COOC₂H₅] | " | [structure: with =C(CN)-CON(C₂H₅)(phenyl), COOC₂H₅] | " |
| 70 | [structure: naphtholactam with COOCH₂-phenyl] | [benzothiazole-CH₂-CN] | [structure with benzothiazole] | red |
| 71 | [structure: naphtholactam with COOC₂H₄-phenyl] | " | [structure with benzothiazole] | " |
| 72 | [structure: naphtholactam with COOC₂H₄-O-phenyl] | " | [structure with benzothiazole] | " |
| 73 | [structure: naphtholactam with COO-cyclohexyl(H)] | " | [structure with benzothiazole] | " |
| 74 | [structure: naphtholactam with COOCH₂CH(C₂H₅)-C₄H₉-n] | " | [structure with benzothiazole] | " |
| 75 | [structure: naphtholactam with COO-CH₂-tetrahydrofuryl] | " | [structure with benzothiazole] | " |

TABLE-continued

| No. | I Naphtholactam compound | II Compound having an active methylene group | III Dyestuffs | IV Shade on polyethylene terephthalate |
|---|---|---|---|---|
| 76 | HN—=O, Br, COOCH₂—CH(CH₃)₂ | H₂N—C(=N)—S (benzothiazole) | HN—C=C—C(benzothiazole), CN, Br, COOCH₂—CH(CH₃)₂ | " |
| 77 | HN—=O, Cl, COOCH₂—CH(CH₃)₂ | " | HN—C=C—C(benzothiazole), CN, Cl, COOCH₂—CH(CH₃)₂ | " |

EXAMPLE 2

A mixture of 4.30 g of naphtholactam-5-carboxylic acid, 3.80 g of benzthiazolyl-acetonitrile and 50 ml of chlorobenzene is stirred at 100° and a mixture of 6.30 ml of phosphorus oxychloride and 6 ml of chlorobenzene is allowed to run in dropwise in the course of about 30 minutes and the mixture is then stirred at the same temperature for a further 2 hours. After cooling, the precipitate, consisting of the product of the formula

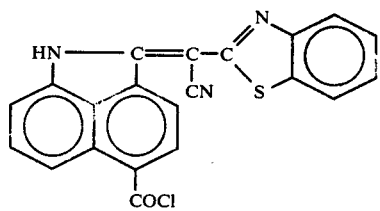

is filtered off and washed with chlorobenzene and strong suction is then applied to the material on the filter.

The dyestuff acid chloride is now suspended in 50 ml of isobutanol and the mixture is heated to the reflux temperature for 2 hours. After cooling, the dyestuff of the formula

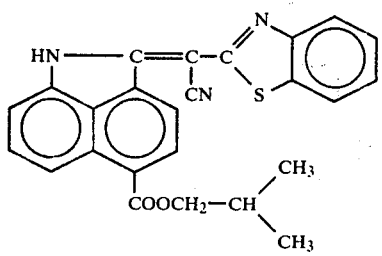

which has formed is isolated by filtration and washed with isobutanol, then with methanol and finally with water. The resulting dyestuff is identical to that prepared according to Example 1.

If, with an otherwise identical procedure, the glycols listed under I in the table which follows are used in place of isobutanol, the dyestuffs of column II are obtained.

| | I Glycols | II Dyestuffs |
|---|---|---|
| 1 | HO—CH₂CH₂OH | HN—C=C—C(benzothiazole), CN, COO—CH₂CH₂OH |
| 2 | HO—CH₂CH₂CH₂OH | HN—C=C—C(benzothiazole), CN, COO—CH₂CH₂CH₂OH |

-continued

| | I<br>Glycols | II<br>Dyestuffs |
|---|---|---|
| 3 | HO—(CH₂)₄—OH | [naphthalene-benzothiazole dye with COO—(CH₂)₄—OH ester] |
| 4 | HO—(CH₂)₆—OH | [naphthalene-benzothiazole dye with COO—(CH₂)₆—OH ester] |
| 5 | HO—CH₂—(CH₂)₈—CH₂OH | [naphthalene-benzothiazole dye with COO—CH₂—(CH₂)₈—CH₂OH ester] |
| 6 | HO—CH₂—C(CH₃)₂—CH₂OH | [naphthalene-benzothiazole dye with COOCH₂—C(CH₃)₂—CH₂OH ester] |
| 7 | HO—CH(CH₃)—CH₂CH₂—CH(CH₃)—OH | [naphthalene-benzothiazole dye with COOCH(CH₃)—CH₂CH₂—CH(CH₃)—OH ester] |
| 8 | HO—CH₂CH₂—CH(CH₃)—CH₂CH₂OH | [naphthalene-benzothiazole dye with COOCH₂CH₂—CH(CH₃)—CH₂CH₂OH ester] |
| 9 | HO—C₂H₄—S—C₂H₄—OH | [naphthalene-benzothiazole dye with COO—CH₂CH₂—S—CH₂CH₂OH ester] |

| I Glycols | II Dyestuffs |
|---|---|
| 10 HO—CH₂—CH(OH)—C₂H₅ |  |

EXAMPLE 3

A mixture consisting of 7.80 g of the dyestuff acid chloride of the formula

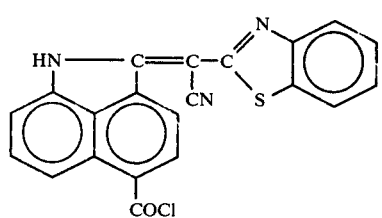

(in the form of the chlorobenzene-moist material from the filter), 5.40 g of p-toluidine, 2.40 g of pyridine and 50 ml of o-dichlorobenzene is stirred at a temperature of 110° for 6 hours. It is allowed to cool to 90° and the product is filtered off using a suction filter and washed with o-dichlorobenzene, then with methanol, then with 1 N hydrochloric acid at about 60° and with water again until the filtrate gives a neutral reaction. The product is then dried at 100°.

The dyestuff of the formula

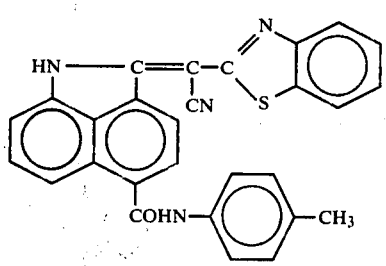

which is thus obtained is recrystallised from 10 parts of dimethylformamide. A finely crystalline red powder is obtained.

If, with an otherwise identical procedure, equivalent amounts of the amines listed under I in the table which follows are used in place of p-toluidine, the dyestuffs of column II, all of which dye polyester fibres in brilliant red shades, are obtained.

| | I Amines | II Dyestuffs |
|---|---|---|
| 1 |  | 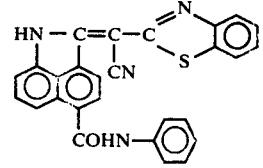 |
| 2 |  | 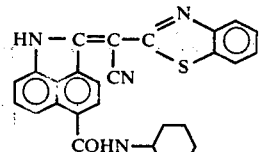 |
| 3 |  | 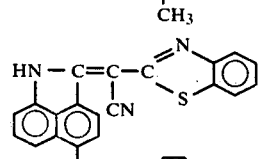 |

| I Amines | II Dyestuffs |
|---|---|
| 4 — 2,6-dimethylaniline | Dyestuff with 2,6-dimethylphenyl amide |
| 5 — 3-methoxy-4-methylaniline | Dyestuff with 3-methoxy-4-methylphenyl amide |
| 6 — 4-tert-butylaniline | Dyestuff with 4-tert-butylphenyl amide |
| 7 — 4-n-butylaniline | Dyestuff with 4-n-butylphenyl amide |
| 8 — 4-cyclohexylaniline | Dyestuff with 4-cyclohexylphenyl amide |
| 9 — 4-chloroaniline | Dyestuff with 4-chlorophenyl amide |
| 10 — 4-phenoxyaniline | Dyestuff with 4-phenoxyphenyl amide |
| 11 — 4-(4-chlorophenoxy)aniline | Dyestuff with 4-(4-chlorophenoxy)phenyl amide |
| 12 — 4-(4-methylphenoxy)aniline | Dyestuff with 4-(4-methylphenoxy)phenyl amide |

-continued
| I Amines | II Dyestuffs |
|---|---|
| 13 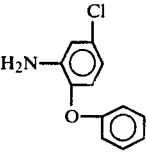 | 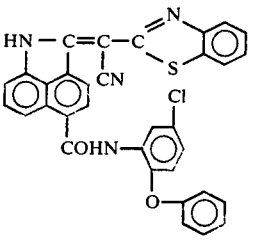 |
| 14 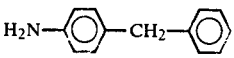 | 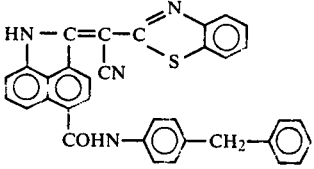 |
| 15 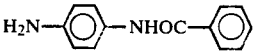 | 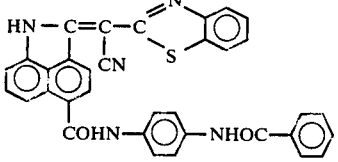 |
| 16 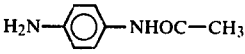 | 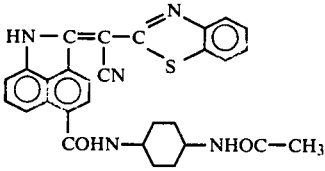 |
| 17 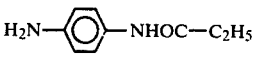 | 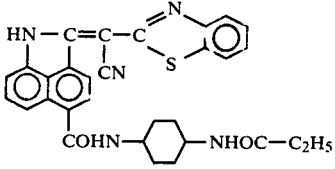 |
| 18 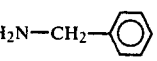 | 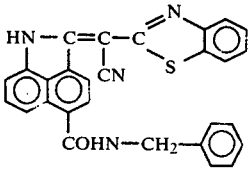 |
| 19 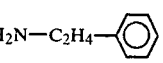 | 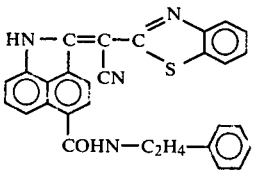 |
| 20 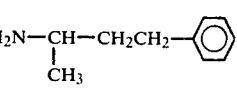 | 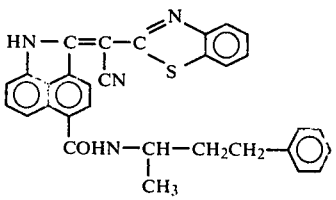 |

-continued

| I<br>Amines | II<br>Dyestuffs |
|---|---|
| 21 (amine structure with H₂N—CH—CH₂CH₂—phenyl, CH₂—CH, CH₃ groups) | (corresponding dyestuff structure) |
| 22 H₂N—cyclohexyl(H) | (corresponding dyestuff) |
| 23 H₂N—cyclohexyl(H)—CH₃ | (corresponding dyestuff) |
| 24 Me, Me, H₂N—cyclohexyl(H)—Me | (corresponding dyestuff) |
| 25 HN(CH₃)—cyclohexyl(H) | (corresponding dyestuff) |
| 26 HN(cyclohexyl(H))₂ | (corresponding dyestuff) |
| 27 HN(C₄H₉-n)₂ | (corresponding dyestuff) |
| 28 H₂N—CH₂CH₂OH | (corresponding dyestuff) |

-continued

| | I Amines | II Dyestuffs |
|---|---|---|
| 29 | CH₃–NH–CH₂CH₂OH | (structure) |
| 30 | HN(CH₂CH₂OH)(cyclohexyl) | (structure) |
| 31 | HN(CH₂CH₂OH)(phenyl) | (structure) |
| 32 | HN(CH₃)(phenyl) | (structure) |
| 33 | HN(C₂H₅)(phenyl) | (structure) |
| 34 | HN(cyclohexyl)(phenyl) | (structure) |
| 35 | H₂N–C(CH₃)₂–CH₂CH₂OH | (structure) |
| 36 | H₂N–(2-chlorophenyl) | (structure) |

| I Amines | II Dyestuffs |
|---|---|
| 37 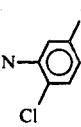 | 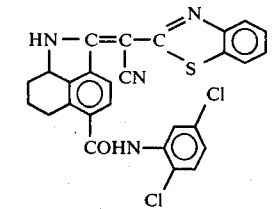 |
| 38 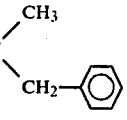 | 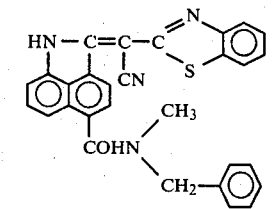 |
| 39 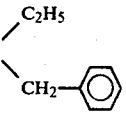 | 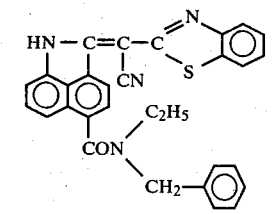 |
| 40 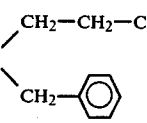 | 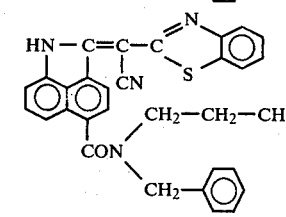 |
| 41 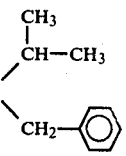 | 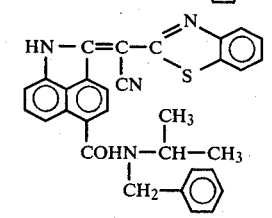 |
| 42 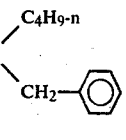 | 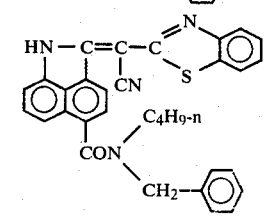 |
| 43 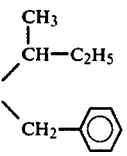 | 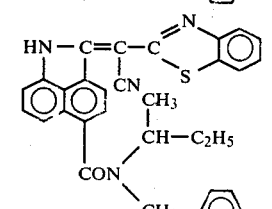 |
| 44 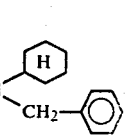 | 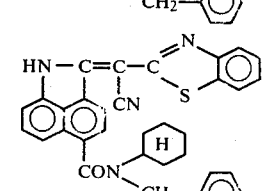 |

-continued

| I Amines | II Dyestuffs |
|---|---|
| 45 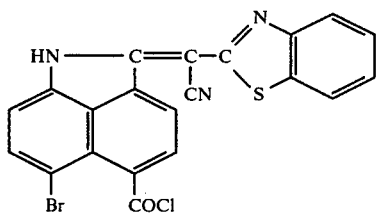 | 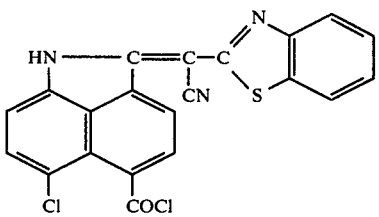 |

EXAMPLE 4

A mixture of 18.9 ml of phosphorus oxychloride and 18 ml of chlorobenzene is allowed to run dropwise, in the course of about 30 minutes, at a temperature of 100°, into a mixture consisting of 17.5 g of 4-bromo-naphthostyryl-5-carboxylic acid, 10.5 g of benzthiazolyl-acetonitrile and 90 ml of chlorobenzene and the resulting mixture is then stirred at the same temperature for a further 3 hours. It is then diluted with 15 ml of chlorobenzene and allowed to cool to room temperature and the acid chloride of the formula which has formed is isolated by filtration and then washed several times with small amounts of chlorobenzene. The acid chloride is used direct in this form for the preparation of the dyestuff.

If, with an otherwise identical procedure, equivalent amounts of 4-chloro-naphthostyryl-5-carboxylic acid are used in place of bromo-naphthostyryl-carboxylic acid, the acid chloride of the formula is obtained.

If, using the same procedure, equivalent amounts of the naphthostyryl-carboxylic acids listed under I in the table which follows and of the heterocyclic compounds listed under II are used, the acid chlorides of column III are obtained.

TABLE

| No. | I Naphthostyryl-carboxylic acids | II Heterocyclic compounds | III Acid chlorides |
|---|---|---|---|
| 1 | | | |
| 2 | " | | |
| 3 | " | | |
| 4 | " | | |

TABLE-continued

| No. | I Naphthostyryl-carboxylic acids | II Heterocyclic compounds | III Acid chlorides |
|---|---|---|---|
| 5 | " | ![structure] benzimidazole-N-CH3 with C-CH2-CN | product with Br, COCl |
| 6 | HN—C=O naphthalene with Cl, COOH | benzoxazole with CH2CN | product with Cl, COCl |
| 7 | " | H3C-benzoxazole-C-CH2-CN | product with CH3, Cl, COCl |
| 8 | " | Cl-benzoxazole-C-CH2-CN | product with Cl, Cl, COCl |
| 9 | " | quinoxaline-NH with C-CH2-CN | product with Cl, COCl |
| 10 | " | benzimidazole-N-CH3 with C-CH2-CN | product with Cl, COCl |

EXAMPLE 5

A mixture consisting of 9.3 g of the acid chloride of the formula

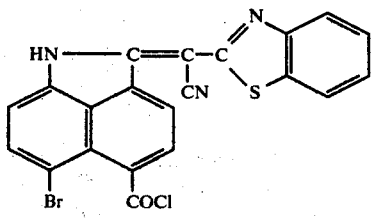

5.4 g of p-toluidine, 2.4 g of pyridine and 30 ml of chlorobenzene is stirred at a temperature of 110° for 6 hours. The mixture is allowed to cool to 90° and the dyestuff which has formed is isolated by filtration and washed several times with chlorobenzene, then with methanol, then with hot 1% strength hydrochloric acid and finally with water until the filtrate gives a neutral reaction. The dyestuff is dried in vacuo at 100° and subsequently purified by recrystallisation from 10 parts of dimethylformamide. The dyestuff of the formula

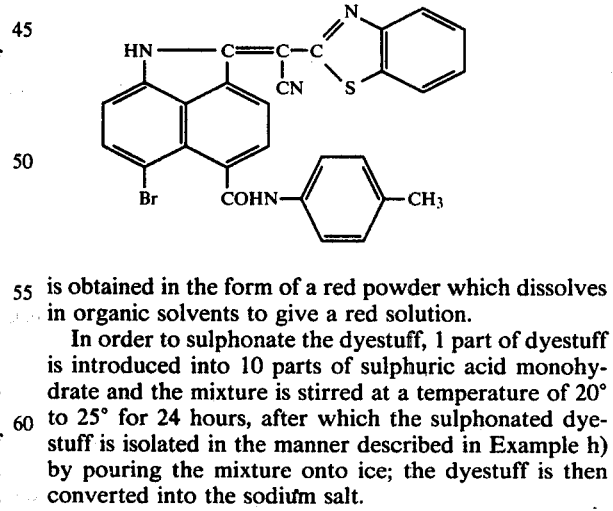

is obtained in the form of a red powder which dissolves in organic solvents to give a red solution.

In order to sulphonate the dyestuff, 1 part of dyestuff is introduced into 10 parts of sulphuric acid monohydrate and the mixture is stirred at a temperature of 20° to 25° for 24 hours, after which the sulphonated dyestuff is isolated in the manner described in Example h) by pouring the mixture onto ice; the dyestuff is then converted into the sodium salt.

When applied from a weakly acid aqueous solution, the dyestuff dyes polyamide fabric brilliant red. The resulting dyeings possess good fastness properties.

If, with an otherwise identical procedure, equivalent amounts of the acid chlorides listed in the table which follows are used in place of the acid chloride mentioned initially and equivalent amounts of the corresponding amines are used in place of p-toluidine, dyestuffs are obtained which, after sulphonation, dye polyamide fabric red. The dyeings show good fastness properties.
TABLE
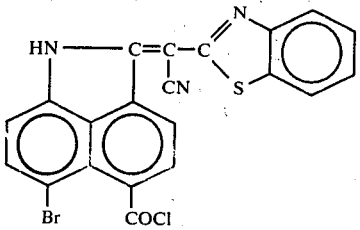
| No. | Amine | Dyestuff |
|---|---|---|
| 1 | | |
| 2 | | |
| 3 | | |
| 4 | | |
| 5 | | |
| 6 | | |
| 7 | | |

TABLE-continued
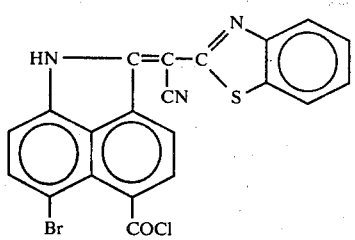
| No. | Amine | Dyestuff |
|---|---|---|
| 8 | | |
| 9 | | |
| 10 | | |
| 11 | | |
| 12 | | |
| 13 | | |
| 14 | | |

TABLE-continued
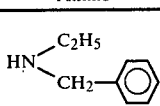
| No. | Amine | Dyestuff |
|---|---|---|
| 15 | 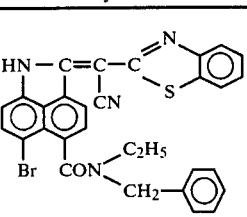 | 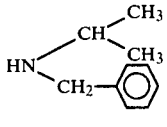 |
| 16 | 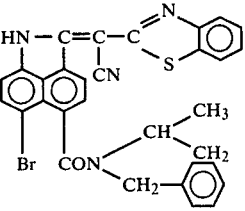 | 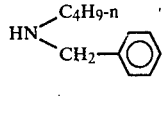 |
| 17 | 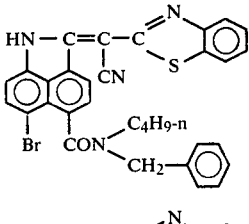 | 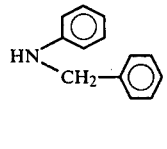 |
| 18 | 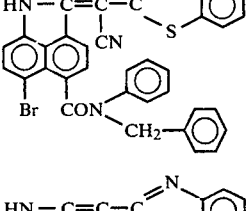 |  |
| 19 | 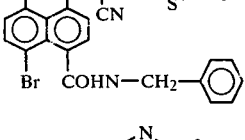 | 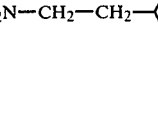 |
| 20 | 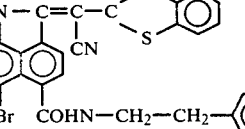 | 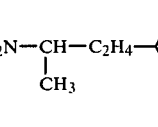 |
| 21 | 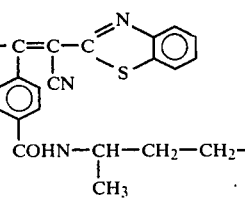 | |

TABLE-continued
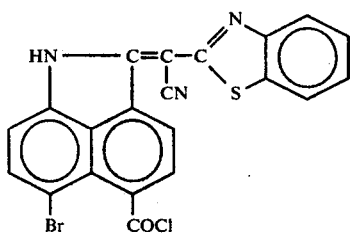
| No. | Amine | Dyestuff |
|---|---|---|
| 22 | | |
| 23 | | |
| 24 | | |
| 25 | | |
| 26 | | |
| 27 | | |
| 28 | | |

TABLE-continued

[Structure: naphthalene with HN- group, C=C linked to benzothiazole with CN substituent, Br and COCl groups]

| No. | Amine | Dyestuff |
|---|---|---|
| 29 | HN(CH₃)(CH₂-C₆H₅) | [Naphthalene-benzothiazole dye with Cl and CON(CH₃)(CH₂-C₆H₅) groups] |
| 30 | H₂N-CH₂-CH₂-C₆H₅ | [Naphthalene-benzothiazole dye with Cl and COHN-CH₂-CH₂-C₆H₅ groups] |
| 31 | H₂N-cyclohexyl | [Naphthalene-benzothiazole dye with Cl and COHN-cyclohexyl groups] |
| 32 | H₂N-(3,3,5-trimethylcyclohexyl) | [Naphthalene-benzothiazole dye with Cl and COHN-(3,3,5-trimethylcyclohexyl) groups] |
| 33 | H₂N-C₆H₄-CH₃ (para) | [Naphthalene-benzoxazole (5-CH₃) dye with Br and COHN-C₆H₄-CH₃ groups] |
| 34 | H₂N-C₆H₄-CH₃ (ortho) | [Naphthalene-benzoxazole (5-CH₃) dye with Br and COHN-C₆H₄-CH₃ (ortho) groups] |
| 35 | H₂N-C₆H₄-O-C₆H₅ | [Naphthalene-benzoxazole (5-CH₃) dye with Br and COHN-C₆H₄-O-C₆H₅ groups] |

TABLE-continued
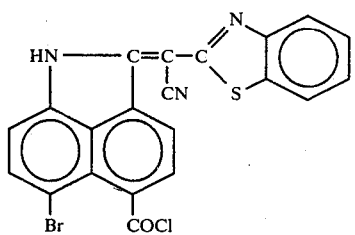
| No. | Amine | Dyestuff |
|---|---|---|
| 36 | HN(CH₃)(CH₂-C₆H₅) | |
| 37 | H₂N-CH₂-CH₂-C₆H₅ | |
| 38 | H₂N-C₆H₁₁ | |
| 39 | H₂N-(3,3,5-trimethylcyclohexyl) | |
| 40 | H₂N-C₆H₄-CH₃ (para) | |
| 41 | H₂N-C₆H₄-CH₃ (ortho) | |
| 42 | H₂N-C₆H₄-O-C₆H₅ | |

TABLE-continued

| No. | Amine | Dyestuff |
|---|---|---|
| 43 | HN(CH₃)(CH₂-C₆H₅) | [structure with 5-chlorobenzoxazole, Br, CON(CH₃)(CH₂-C₆H₅)] |
| 44 | H₂N-CH₂-CH₂-C₆H₅ | [structure with 5-chlorobenzoxazole, Br, COHN-CH₂-CH₂-C₆H₅] |
| 45 | H₂N-cyclohexyl | [structure with 5-chlorobenzoxazole, Br, COHN-cyclohexyl] |
| 46 | H₂N-(3,3,5-trimethylcyclohexyl) | [structure with 5-chlorobenzoxazole, Br, COHN-(3,3,5-trimethylcyclohexyl)] |
| 47 | H₂N-C₆H₄-CH₃ (para) | [structure with benzimidazole, Br, COHN-C₆H₄-CH₃] |
| 48 | H₂N-C₆H₄-CH₃ (ortho) | [structure with benzimidazole, Br, COHN-C₆H₄-CH₃] |
| 49 | H₂N-C₆H₄-O-C₆H₅ | [structure with benzimidazole, Br, COHN-C₆H₄-O-C₆H₅] |

TABLE-continued
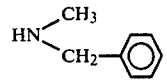
| No. | Amine | Dyestuff |
|---|---|---|
| 50 | 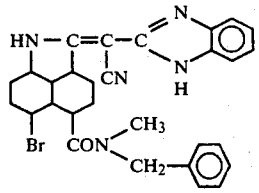 | 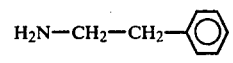 |
| 51 | 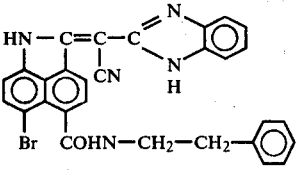 |  |
| 52 | 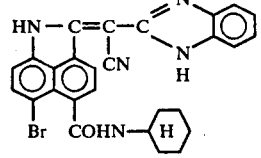 | 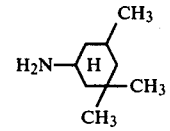 |
| 53 | 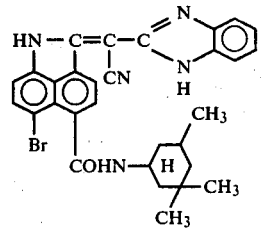 | 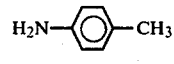 |
| 54 | 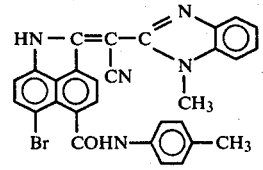 | 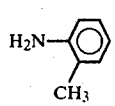 |
| 55 | 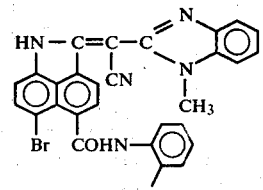 | 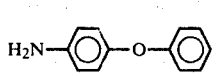 |
| 56 | 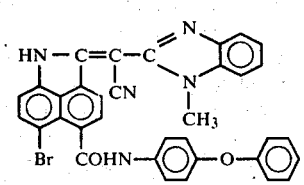 | |

TABLE-continued

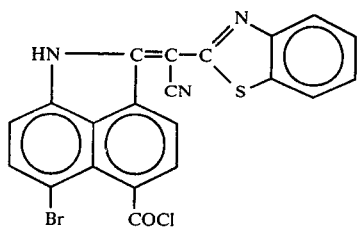

| No. | Amine | Dyestuff |
|---|---|---|
| 57 | HN(CH₃)(CH₂—C₆H₅) | (structure with CON(CH₃)(CH₂—C₆H₅)) |
| 58 | H₂N—CH₂—CH₂—C₆H₅ | (structure with COHN—CH₂—CH₂—C₆H₅) |
| 59 | H₂N—C₆H₁₁ | (structure with COHN—C₆H₁₁) |
| 60 | H₂N—C₆H₈(CH₃)₃ | (structure with COHN—C₆H₈(CH₃)₃) |

EXAMPLE 6

4 g of the compound of the formula

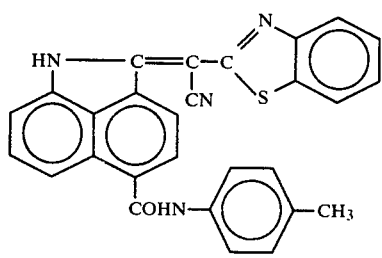

are introduced into 40 g of sulphuric acid monohydrate, whilst stirring, and the mixture is then stirred at room temperature for 24 hours, after which it is poured into a mixture of 75 g of ice and 25 ml of a 25% strength solution of sodium chloride. The precipitate which has formed is filtered off and then suspended in 50 ml of water. The pH value of the mixture is corrected to 7.0 by adding 1 N sodium hydroxide solution and the mixture is then warmed to 90°, 10 g of sodium chloride are introduced and the temperature is maintained for 10 minutes, after which the mixture is allowed to cool. The sodium salt of the dyestuff formed is isolated at a temperature of 55° by filtration and is then dried in vacuo at 70°. The dyestuff which is thus obtained is a red powder which dissolves in water to give a red solution.

When applied from a weakly acid bath to polyamide fabric it gives a brilliant scarlet dyeing with good fastness to wet processing and good fastness to light.

If the dyestuffs of the above table are used in place of the compound mentioned above and these dyestuffs are sulphonated with sulphuric acid monohydrate or oleum, which has a $SO_3$ content in the range up to 10%, and in the temperature range of 10° to 40°, so that in each case one to at most two sulpho groups are introduced, dyestuffs which dye polyamide fabric (abbreviated as PA) red and have similar good properties, are obtained.

If, in place of the compounds of the above table, the dyestuffs listed in the table which follows are so sulphonated, in the manner described above, that the acid dyestuffs formed contain one to at most two sulpho groups, dyestuffs which have similar properties on polyamide fabric are again obtained.

| Dyestuffs | Shade on PA |
|---|---|
| 1  (naphthalene with HN—C=C—C benzothiazole, CN, COOCH₂—CH(CH₃)₂) | red |
| 2  (—COOC₄H₉-n) | red |
| 3  (—COOCH(CH₃)—CH₂CH₃) | red |
| 4  (—COOCH₂—CH(C₂H₅)—C₄H₉) | red |
| 5  (—COO—cyclohexyl) | red |
| 6  (—COOCH₂—C₆H₅) | red |
| 7  (—COO—CH₂CH₂—C₆H₅) | red |
| 8  (—COO—CH₂CH₂—O—C₆H₅) | red |
| 9  (—COOCH₂—CH(CH₃)₂) | red |
| 10 (—COO—CH₂CH₂OH) | red |
| 11 (—COO—(CH₂)₄—OH) | red |
| 12 (—COO—(CH₂)₆—OH) | red |
| 13 (—COO—CH₂—(CH₂)₈—CH₂OH) | red |
| 14 (—COO—CH₂—C(CH₃)₂—CH₂OH) | red |
| 15 (—COO—CH₂CH₂—CH(CH₃)—CH₂CH₂OH) | red |
| 16 (—COO—CH₂CH₂—S—CH₂CH₂OH) | red |
| 17 (benzimidazole NH, —COO—CH₂—CH(CH₃)₂) | red |
| 18 (benzimidazole NH, —COO—CH(CH₃)—C₂H₅) | red |

| Dyestuffs | Shade on PA |
|---|---|
| 19 (structure: naphthalene with HN-C=C(CN)-C=N-benzimidazole, N-CH3, other ring CH3; COO-CH2-CH(CH3)CH3) | red |
| 20 (structure: similar, N-CH3; COO-CH(CH3)-C2H5) | red |
| 21 (structure: similar, N-C2H5; COO-CH2-CH(CH3)CH3) | red |
| 22 (structure: benzimidazole with CH2-phenyl substituent, N-CH3; COOC2H5) | red |
| 23 (structure: benzimidazole with CH2-phenyl, N-CH3; COO-CH2-CH(CH3)CH3) | red |
| 24 (structure: benzimidazole with SO2-phenyl, N-CH3; COOCH2-CH(CH3)CH3) | red |
| 25 (structure: benzimidazole with SO2-phenyl, N-CH3; COOC2H5) | red |
| 26 (structure: benzimidazole with Cl and O-phenyl, N-CH3; COOC2H5) | red |
| 27 (structure: benzimidazole, N-C2H5; COO-CH(CH3)-C2H5) | red |
| 28 (structure: naphthalene with CN at 4-position, benzimidazole N-C2H5) | red |
| 29 (structure: benzimidazole N-CH2-phenyl; COOCH3) | red |
| 30 (structure: benzimidazole N-CH2-phenyl; COOC2H5) | red |
| 31 (structure: benzimidazole N-C2H4-phenyl; COOC2H5) | red |
| 32 (structure: benzimidazole N-C2H4-phenyl; COOCH3) | red |
| 33 (structure: benzimidazole N-CH2CH2-O-phenyl; COOCH3) | red |
| 34 (structure: benzimidazole N-CH2CH2-O-phenyl; COOC2H5) | red |
| 35 (structure: bis-benzothiazole; COOCH3) | red |

-continued

| Dyestuffs | Shade on PA |
|---|---|
| 36 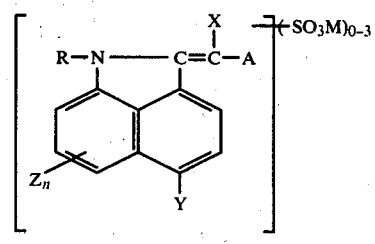 | red |
| 37 | red |

EXAMPLE 7

2 g of the dyestuff obtained according to Example 1 are dispersed in 4,000 g of water. 12 g of the sodium salt of o-phenylphenol, as a swelling agent, and 12 g of diammonium phosphate are added to this dispersion and 100 g of a yarn made of polyethylene glycol terephthalate are dyed for 1½ hours at 95° to 98°. The dyeing is rinsed and after-treated with aqueous sodium hydroxide solution and a dispersing agent.

This gives a bluish-tinged red dyeing which is fast to washing, light and sublimation.

If, in the above example, the 100 g of polyethylene glycol terephthalate yarn are replaced by 100 g of cellulose triacetate fabric, dyeing is carried out under the indicated conditions and the dyeing is then rinsed with water, a bluish-tinged red dyeing which has very good fastness to washing and sublimation is obtained.

EXAMPLE 8

2 g of the dyestuff obtained according to Example 1 are finely suspended in 2,000 g of water which contains 4 g of oleylpolyglycol ether, in a pressure-dyeing machine. The pH value of the dye bath is adjusted to 4 to 5 with acetic acid.

100 g of a fabric made of polyethylene glycol terephthalate are now introduced at 50°, the bath is heated to 140° in the course of 30 minutes and dyeing is carried out for 50 minutes at this temperature. The dyeing is then rinsed with water, soaped and dried. When these conditions are maintained, a bluish-tinged red dyeing which is fast to washing, perspiration, light and sublimation is obtained.

The dyestuffs described in the other examples give dyeings of equal quality by this process.

If, in the above example, the 100 g of polyethylene glycol terephthalate yarn are replaced by 100 g of cellulose triacetate yarn, dyeing is carried out under the indicated conditions and the dyeing is then rinsed with water, a bluish-tinged red dyeing which has very good fastness to light and sublimation is obtained.

EXAMPLE 9

Polyethylene glycol terephthalate fabric is impregnated, on a padder, at 40° with a liquor of the following composition: 20 g of the dyestuff obtained according to Example 1, finely dispersed in 7.5 g of sodium alginate, 20 g of triethanolamine, 20 g of octylphenolpolyglycol ether and 900 g of water.

The fabric, which is squeezed off to about 100%, is dried at 100° and then set for 30 seconds at a temperature of 210°. The dyed goods are rinsed with water, soaped and dried. Under these conditions a bluish-tinged red dyeing which is fast to washing, rubbing, light and sublimation is obtained.

The dyestuffs described in the other examples give dyeings of equal quality by this process.

EXAMPLE 10

100 g of "Banlon" ® tricot (a polyamide fabric) are introduced at 40° into a dye bath which contains 1 g of the dyestuff obtained according to Example 7 and 3 ml of 85% strength formic acid in 5,000 ml of water. Whilst agitating well, the bath is heated to the boil in the course of 30 minutes and dyeing is carried out for one hour at the boil. The dyed goods are then carefully rinsed and dried. A clear, brilliant, scarlet dyeing of good tinctorial strength is obtained.

EXAMPLE 11

100 g of wool, which has been well pre-wetted, are introduced at 50° into a dye bath which contains 1 g of the dyestuff obtained according to Example 7, 5 g of sodium sulphate and 3 ml of 40% strength acetic acid in 5,000 ml of water, the bath is heated to the boil in the course of 15 minutes and dyeing is carried out for one hour at the boil. A clear, brilliant and fluorescent scarlet wool dyeing is obtained.

What is claimed is:

1. A naphtholactam dyestuff of the formula wherein
R is hydrogen, alkyl of 1–8 carbons, hydroxyalkyl of 2–3 carbons, alkoxyalkyl of 3–8 carbons, β-chloroethyl, β-cyanoethyl, alkoxycarbonylethyl wherein the alkoxy moiety thereof has 1–4 carbons, carbamoylethyl, N-alkylcarbamoylethyl wherein the alkyl moiety thereof has 1–4 carbon atoms, N,N-dialkylcarbamoylethyl wherein each alkyl moiety thereof has 1–4 carbon atoms, cyclohexyl, benzyl, phenethyl, phenyl, or alkenyl of 1–5 carbon atoms; Y is —CN, —COCl, —CO—Q' or —COOR$_1$; X is —COOH, —COO$^\ominus$ cation$^\oplus$, —CN, —COOR$_1$, or —SO$_2$T; A is

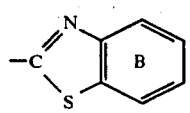

wherein the ring B is unsubstituted or mono-substituted by halo, lower alkyl, lower alkoxy, hydroxy, cyano, vinyl, nitro, lower alkylamino, dialkylamino, phenylamino N-phenyl -N-alkylamino, phenyl or phenoxy;

Z is $C_1$-$C_4$ alkyl, $C_1$-$C_4$ alkoxy, Cl, Br, $NO_2$, phenylsulfonyl, $C_1$-$C_4$ alkyl —S—, $C_1$-$C_4$ alkylsulfonyl, cyano, —$CONH_2$, —$CONH(C_1-C_4$ alkyl), $CON(C_4$ alkyl$)_2$;

n is 0, 1 or 2;

$R_1$ and $R_1'$ are independently $C_1$-$C_{18}$ alkyl which is unsubstituted or substituted by $C_1$-$C_4$ alkoxy, hydroxy, chloro, bromo, cyano, carboxy, carb-$C_1$-$C_4$-alkoxy, sulfo, carboxamido or acetoxy; cyclopentyl; methylcyclohexy; trimethylcyclohexyl; cyclohexyl; phenyl, benzyl or phenethyl which are unsubstituted or monosubstituted by $C_1$-$C_4$-alkyl, lower alkoxy or halo; —$CH_2CH_2SCH_2CH_2OH$; $C_2$-$C_5$ alkenyl; or

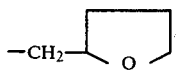

Q' is $NHR_1'$ or $NR_1'$, $R_2'$ wherein $R_2'$ has the same meaning as $R_1'$ as defined above;

T is $C_1$-$C_8$ alkyl, $C_2$-$C_8$ alkenyl or $C_6$-$C_9$ phenyl; and

M is hydrogen or a cation.

2. A dyestuff according to claim 1, wherein X is CN.

3. A naphtholactam dyestuff of the formula

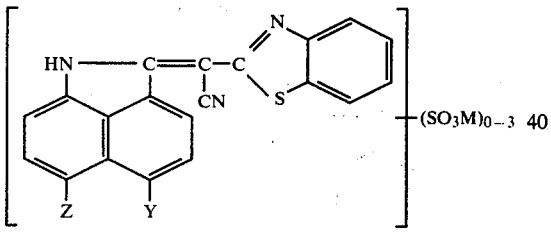

wherein

R is H or $C_1$-$C_5$ alkyl,

Z is H, Cl or Br,

Y is CN, COCl, COQ' or $COOR_1'$, where

Q' is as defined in claim 1, $R_1'$ is $C_{1-18}$ alkyl, $C_{1-18}$ hydroxyalkyl, —$CH_2CH_2SCH_2CH_2OH$; $C_{2-5}$ alkenyl, $C_{6-9}$ cycloakyl, phenyl, benzyl or phenethyl or

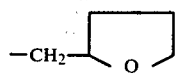

and

M is hydrogen or a cation.

4. A dyestuff according to claim 1, of the formula

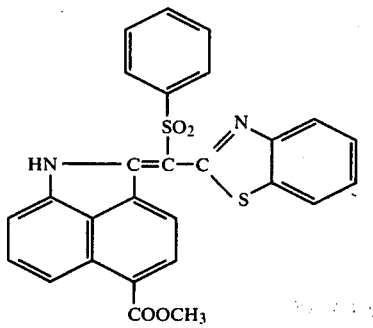

5. A dyestuff according to claim 3, of the formula

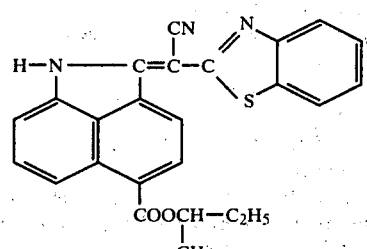

6. A dyestuff according to claim 3, of the formula

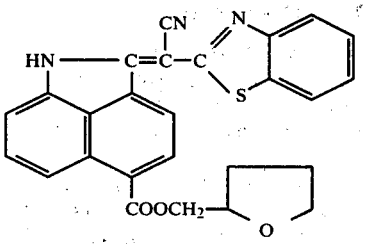

* * * * *

UNITED STATES PATENT AND TRADEMARK OFFICE
CERTIFICATE OF CORRECTION

PATENT NO. : 4,256,896

DATED : Mar. 17, 1981

INVENTOR(S) : Hansrudolf Schwander

It is certified that error appears in the above—identified patent and that said Letters Patent is hereby corrected as shown below:

Column 83, Line 10    Delete "CON($C_4$" and insert --CON($C_1$-$C_4$--.

Column 83, Line 17    Delete "methylcyclohexy" and insert --methylcyclohexyl--.

Column 84, Line 1    Delete "cycloakyl" and insert --cycloalkyl--.

Signed and Sealed this

Twenty-first Day of July 1981

[SEAL]

Attest:

GERALD J. MOSSINGHOFF

Attesting Officer    Commissioner of Patents and Trademarks